US012603081B2

(12) United States Patent     (10) Patent No.:   US 12,603,081 B2

Chernenkov et al.     (45) Date of Patent:    Apr. 14, 2026

(54) METHOD AND SERVER FOR A TEXT-TO-SPEECH PROCESSING

(71) Applicant: YANDEX EUROPE AG, Lucerne (CH)

(72) Inventors: Dmitry Mikhailovich Chernenkov, Moscow (RU); Vladimir Vladimirovich Kirichenko, Moscow (RU); Ivan Sergeevich Baskov, Krasnodar (RU); Sergey Nazimovich Dzhunusov, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 1077 days.

(21) Appl. No.: 17/475,724

(22) Filed: Sep. 15, 2021

(65) Prior Publication Data

US 2022/0084499 A1     Mar. 17, 2022

(30) Foreign Application Priority Data

Sep. 15, 2020    (RU) ................................ 2020130360

(51) Int. Cl.
    *G10L 13/047*       (2013.01)
    *G06N 3/04*        (2023.01)
    (Continued)

(52) U.S. Cl.
    CPC .............. *G10L 13/047* (2013.01); *G06N 3/04* (2013.01); *G06N 3/0464* (2023.01); *G10L 25/30* (2013.01)

(58) Field of Classification Search
    CPC ......... G10L 13/047; G10L 25/30; G06N 3/04; G06N 3/0464; G06N 3/045; G06N 3/08
    See application file for complete search history.

(56) References Cited

U.S. PATENT DOCUMENTS

| | | | |
|---|---|---|---|
| 11,232,016 B1 * | 1/2022 | Huynh ................... | G06N 3/045 |
| 2008/0183473 A1 | 7/2008 | Nagano et al. | |

(Continued)

FOREIGN PATENT DOCUMENTS

| | | |
|---|---|---|
| RU | 2488232 C2 | 7/2013 |
| WO | 9904386 A1 | 1/1999 |
| WO | 2020118521 A1 | 6/2020 |

OTHER PUBLICATIONS

NVIDIA Geforce GTX 1080 Press Release, archived on May 9, 2016, and available at https://web.archive.org/web/20160509062338/https://nvidianews.nvidia.com/news/a-quantum-leap-in-gaming:-nvidia-introduces-geforce-gtx-1080 (Year: 2016).*

(Continued)

*Primary Examiner* — Omar F Fernandez Rivas
*Assistant Examiner* — Michael C. Lee
(74) *Attorney, Agent, or Firm* — BCF LLP

(57) ABSTRACT

Methods and servers for processing a textual input for generating an audio output are disclosed. The audio output is a sequence of waveform segments generated in real-time by a trained Convolutional Neural Network. The method includes, at a given iteration, generating a given waveform segment which includes storing first tensor data computed by a first hidden layer during the given iteration, and where the first tensor data has tensor-chunk data. The tensor-chunk data is used during the given iteration for generating the given waveform segment and is to be used during a next iteration for generating a next waveform segment. The method includes, at the next iteration, generating the next waveform segment, which comprises storing second tensor data computed by the first hidden layer during the next iteration. The second tensor data excludes redundant tensor-chunk data that is identical to the tensor-chunk data from the first tensor data.

9 Claims, 8 Drawing Sheets

(51) Int. Cl.
    G06N 3/0464        (2023.01)
    G10L 25/30         (2013.01)

(56)                 References Cited

U.S. PATENT DOCUMENTS

| | | | |
|---|---|---|---|
| 2016/0171974 A1 | 6/2016 | Hannun et al. | |
| 2018/0253635 A1* | 9/2018 | Park | G06F 7/535 |
| 2019/0042092 A1* | 2/2019 | Wu | G06N 3/063 |
| 2019/0114547 A1* | 4/2019 | Jaganathan | G06N 3/047 |
| 2019/0180732 A1 | 6/2019 | Ping et al. | |
| 2019/0362703 A1 | 11/2019 | Ijima et al. | |
| 2020/0027026 A1* | 1/2020 | Cook | G06N 3/04 |
| 2020/0082806 A1 | 3/2020 | Kim et al. | |
| 2020/0342852 A1 | 10/2020 | Kim et al. | |
| 2020/0402497 A1 | 12/2020 | Semenov et al. | |
| 2021/0090549 A1* | 3/2021 | Lombardo | G10L 25/18 |
| 2021/0209442 A1* | 7/2021 | Jiao | G06N 3/04 |

OTHER PUBLICATIONS

Riera, Marc, et al. "Computation reuse in DNNs by exploiting input similarity." 2018 ACM/IEEE 45th Annual International Symposium on Computer Architecture (ISCA). IEEE, 2018, pp. 57-68 (Year: 2018).*

Jin, Tian, et al. "Split-cnn: Splitting window-based operations in convolutional neural networks for memory system optimization." Proceedings of the Twenty-Fourth International Conference on Architectural Support for Programming Languages and Operating Systems. 2019, pp. 835-847 (Year: 2019).*

Ning, Lin, et al. "Deep reuse: Streamline CNN inference on the fly via coarse-grained computation reuse." Proceedings of the ACM International Conference on Supercomputing. 2019, pp. 438-448 (Year: 2019).*

Willis, Andrew, et al. "Measuring compute-reuse opportunities for video processing acceleration." 2019 SoutheastCon. IEEE, 2019, pp. 1-7 (Year: 2019).*

Angrick et al., "Speech synthesis from ecog using densely connected 3d convolutional neural networks", Published on Nov. 27, 2018, DOI: 10.1088/1741-2552/ab0c59, https://pubmed.ncbi.nlm.nih.gov/30831567/.

Mwiti, "A 2019 Guide to Speech Synthesis with Deep Learning", Published on Aug. 28, 2019, https://heartbeat.fritz.ai/a-2019-guide-to-speech-synthesis-with-deep-learning-630afcafb9dd.

Salah et al., "Continuous vocoder in feed-forward deep neural network based speech synthesis", Published as a conference paper : Digital Speech and image processing (DOGS_2017), at Serbia, Novi Sad on Nov. 2017.

Ping et al. "ClariNet: Parallel Wave Generation in End-to-End Text-to-Speech", Feb. 22, 2019; https://arxiv.org/pdf/1807.07281.pdf, 15 pages.

Song, "Efficient WaveGlow: An Improved WaveGlow Vocoder with Enhanced Speed", Interspeech 2020, Oct. 25-29, 2020, Shanghai, China.

Wang, "KDGAN: Knowledge Distillation with Generative Adversarial Networks", 32nd Conference on Neural Information Processing Systems (NeurIPS 2018), Dec. 2-8, 2018, Montréal, Canada.

Russian Search Report dated Jan. 18, 2022 issued in respect of the counterpart Russian Patent Application No. RU 2020130360.

\* cited by examiner

700

START generating, by the server, CNN input data based on textual input

702 at a given in-use iteration of the CNN, generating a given waveformsegment of the audio output

704 at the next in-use iteration of the CNN, generating the next waveform segment of the audio output

706

END

METHOD AND SERVER FOR A TEXT-TO-SPEECH PROCESSING

CROSS-REFERENCE

The present application claims priority to Russian Patent Application No. 2020130360, entitled "METHOD AND SERVER FOR A TEXT-TO-SPEECH PROCESSING", filed Sep. 15, 2020, the entirety of which is incorporated herein by reference.

FIELD

The present technology relates to intelligent personal assistant systems and, more particularly, to a method and an electronic device for performing a text-to-speech processing.

BACKGROUND

Electronic devices, such as smartphones and tablets, are able to provide users access to an increasing and diverse number of applications and services for processing and/or accessing different types of information. However, novice users and/or impaired users and/or users operating a vehicle may not be able to effectively interface with such devices mainly due to the variety of functions provided by these devices or the inability to use the machine-user interfaces provided by such devices (such as a key board). For example, a user who is driving or a user who is visually-impaired may not be able to use the touch screen key board associated with some of these devices.

Intelligent Personal Assistant (IPA) systems have been developed to perform functions in response to user requests. Such IPA systems may be used, for example, for information retrieval and navigation. A conventional IPA system, such as Siri® IPA system for example, can accept simple human natural language inputs from a device and perform a large variety of tasks for the user. For example, a user can communicate with Siri® IPA system by providing spoken utterances (through Siri®'s voice interface) for asking, for example, what the current weather is, where the nearest shopping mall is, and the like. The user can also ask for execution of various applications installed on the electronic device.

Conventional IPA systems are configured to "respond" promptly to user requests. In other words, how quickly an IPA system can provide a machine-generated utterance as a response to a user spoken utterance plays an important role in user satisfaction with the IPA system.

SUMMARY

Intelligent Personal Assistant (IPA) systems are used to provide voice-enabled interactivity between users and electronic devices. This ability can allow users to conveniently interact with devices, for example, when the user is visually handicapped, when the device does not have a traditional visual display (e.g., smart speakers), and/or when the user's hands or eyes are otherwise occupied (e.g., driving).

Developers of the present technology have appreciated certain technical drawbacks associated with the existing IPA systems. At least one drawback of conventional IPA systems is their limited responsiveness to user requests. In other words, some conventional IPA systems may require a non-satisfactory amount of time for providing a machine-generated utterance in response to a user spoken utterance. It is an object of the present technology to ameliorate at least some of the inconveniences present in the prior art.

In some embodiments of the present technology, developers of the present technology envisaged a system that can generate "portions" of a machine-generated utterance in real-time, and provide them to the user as they are generated. As a result, the user does not need to wait until the machine-generate utterance is fully generated, and instead, is provided with portions thereof as they are being generated, which reduces the amount of time between the user spoken utterance being captured by a device and a moment in time when the user begins to being provided with portions of the machine-generated utterance by the device.

It should be noted that real-time generation and provision of the machine-generated utterance in portions, while retaining a high quality of the machine-generated utterance as a whole, is a difficult task because, in order to have a high quality machine-generated utterance as a whole, a given portion being generated should be perceived as a seamless continuation of other (previous) portion(s) of the machine-generated utterance. Nevertheless, some methods and systems disclosed herein are capable of real-time provision of these "portions" without compromising (or at least with minimum compromise) on the quality of the machine-generated utterance as a whole. As it will become apparent from the description herein below, such real-time generation may be enabled by employing a particular Convolutional Neural Network (CNN) configured to generate waveform segments in real-time and which are representative of a complete machine-generated utterance to be provided as a response to a user spoken utterance.

In other embodiments of the present technology, developers of the present technology envisaged a system that can increase the responsiveness of the IPA system (reduce the amount of time between the user spoken utterance and the provision of at least a portion of the machine-generated utterance) by optimizing the amount of operations, as well as memory space, required by the above-mentioned CNN for generation of the waveform segments in real-time.

Developers of the present technology have realized that some internal data (tensor data) computed by the CNN during generation of a given waveform segment of the full machine-generated utterance can be re-used during generation of a subsequent waveform segment of the full machine-generated utterance (without requiring re-computation). In other words, developers of the present technology have realized that some tensor data computed by the CNN during a given in-use iteration thereof can be re-used during a next in-use iteration thereof.

As it will become apparent from the description herein further below, developers of the present technology have devised methods and systems where a number of computational operations required for performing two subsequent in-use iterations of the CNN is reduced, because some of the tensor data does not need to be re-computed during a subsequent iteration, but rather retrieved from memory since it was computed and stored during the previous iteration. It should also be noted that avoiding such redundant computational operations allows reducing the amount of memory space required for performing two subsequent in-use iterations of the CNN—that is, computing and storing redundant data increases the amount of operations and the amount memory space needed for storing the same data twice.

As mentioned above, a CNN is employed in the context of the present technology for generating segments of an audio output in real-time. How CNNs can be implemented by a server will now be described.

3

1-D CNNs

A 1-D convolution can be defined as a product of two tensors:

$$Y = X * W$$

where $X \in R^{T_i x O}$ is the input tensor, $Y \in R^{T_o x O}$ is the output tensor, $W \in R^{O x I x K}$ is the tensor of the weights of the model, $T_i$ is the input length, I is the number of input channels, $T_o$ is the output length, O is the number of output channels (also known as the number of filters), and K is the size of filters.

In some CNNs, tensors X and Y have a third dimension B, the so-called Butch size. In the present example, this will be omitted—that is, B=1. If we consider a convolution without sparseness or padding, then:

$$T_o = T_i - K + 1$$

The values of the Y tensor elements can be calculated using the formula:

$$Y_{t,o} = \sum_{k=0}^{K-1} \sum_{i=1}^{I} X_{t+k,i} W_{o,i,k}$$

It should be noted that it includes a multiplication operation. In total, $N_{mult} = T_o * K * I * O$ multiplications are required for performing the computation of the Y tensor elements. For storing output the result need $N_{memory} = T_o * O$ of real-numbered cells.

Such operations are common for many NN architectures. In libraries for training NNs (especially cuDNNs), such operations can be implemented with a high degree of optimization, using computing resources—for example, General Purpose computing on Graphical Processing Units (GPGPU)—as efficiently as possible. However, some requirements may need to be met with regard to the location of elements X, Y, and W in memory.

N-D CNNs

In the context of an NN with N convolutional layers (i.e., N-D CNN), the tensors are as follows:

$$X_n = X_{n-1} * W_n$$

where $X_n \in R^{T_n x C_n}$, and which include the input tensor $X_0$, the output tensor $X_N$, and intermediate tensors, and where $W_n \in R^{C_n x C_{n-1} x K_n}$ are tensors of weights of the model's layers. In this case:

$$T_n = T_{n-1} - K_n + 1 = T_o - \sum_{l=1}^{n} K_l + n$$

It should be noted that calculating the entire sequence of layers requires the following number of multiplication operations:

$$N_{mult} = \sum_{n=1}^{N} C_{n-1} C_n T_n K_n \sim O(NC^2 TK)$$

and the following number of cells for storing intermediate and output results:

$$N_{memory} = \sum_{n=1}^{N} T_n * C_n \sim O(NCT)$$

4 where O( ) can be estimated for cases when the respective sizes of layers and filters of each layer are the same.

Streaming CNNs

It should be noted that CNNs can also be used when not all input data is available simultaneously and is rather received in real-time. Such CNNs may sometimes be referred to as "streaming" CNNs, where input data is provided for respective iterations of the CNN. For example, for the m−1 iteration $T_o = T_o$ (m−1), and for them iteration $T_o = T_o$ (m)=$T_o$ (m−1)+ΔT (m). As such, values of a new tensor-chunk are added to the values of the tensor $X_0$ (m−1), such that:

$$X_0(m) = \left[ X_0(m-1) X_0^A(m) \right], \ X_0^A(m) \in R^{\Delta T_0(m) \times C_0}$$

It is possible to calculate all the values of the tensor $X_1$ (m)=$X_0$ (m)*$W_1$ again, however, the first $T_1$ (m) values have already been calculated in the previous step. Therefore, it should be noted that $X_1$ (m) can be represented as $$\left[ X_1(m-1) X_1^A(m) \right],$$

and that only the new values may need to be calculated for the first layer. To that end, not all the old values $X_0$(m−1) are needed, but only the latest (K−1) values. As such, using a same computer-implemented procedure it is possible to compute:

$$X_1^A(m) = \left[ X_0^E(m-1) X_0^A(m) \right] * W_1$$

Where $$X_0^E(m-1) = X_0(m-1)[T_0(m) - K + 1, \ldots T_0(m)]$$

are the last K columns of the tensor $X_0$(m−1). It should be noted that computation a tensor $$\left[ X_0^E(m-1) X_0^A(m) \right]$$

in an effective implementation of a convolutional operation may require the allocation of an additional memory workspace and the copying of all components therein.

It should also be noted that the size of the new tensor $$X_1^A(m)$$

along T dimension is equal to the size of $$X_0^A(m)$$

and is equal to ΔT (m). This equality can be observed not only for the convolutions that have been discussed above, but also for other variants of convolutions with stride equal to 1.

One way of performing computations for a sequence of layers of a streamlining CNN will now be described. Let it be assumed that after computing $$X_0^A(m),$$

we want to compute $$X_n^A(m) \in R^{\Delta T(m) \times C_n}.$$

How such a calculation scheme can be implemented (without storing intermediate data from previous iterations) is depicted via representation 800 on FIG. 8. It is assumed that parts of tensors in depicted in gray are not stored in memory. The dimension of tensors $$X_n^E$$

are the following:

$$X_N^E(m) \in R^{(K_N - 1) \times C_N}$$

$$X_{N-1}^E(m) \in R^{(K_N + K_{N-1} - 2) \times C_{N-1}}$$

$$...$$

$$X_0^E(m) \in R^{(\Sigma_{N-1}^N K_n - N) \times C_0}$$

If using such an approach, the number of multiplication operations for computing $$X_n^A(m)$$

is equal to:

$$N_{mult} = \sum_{n=1}^{N} C_{n-1} * C_n * \left( \Delta T + \sum_{l=n}^{N} K_l - N + l \right) * K_n \sim O(NC^2 K(\Delta T + NK))$$

and storing the intermediate data may require:

$$N_{memory} = \sum_{n=1}^{N} \left( \Delta T + \sum_{l=n}^{N} K_l - N + l \right) * C_n \sim O(NC(\Delta T + NK))$$

Such an approach for implementing a streaming CNN is less than optimum. However, frameworks like TensorRT, which may not allow storing intermediate results between calls to the model, may need to implement such an approach for executing the streamlining CNN.

In at least some non-limiting embodiments of the present technology, instead of using the above described approach where intermediate data is not re-used between subsequent iterations, the developers of the present technology have devised methods and systems where intermediate results of $$X_N^A(m)$$

may be retained, stored, and re-used for a subsequent iteration.

How such modified calculation scheme can be implemented (while storing intermediate data from previous iterations) is depicted via representation 850 on FIG. 8. In this case, the T dimension of intermediate fragments required from the previous iterations is $$X_n^E(m) \in R^{(K_n - 1) \times C_n}$$

However, it should be noted that the complexity of calculations is different from previous approach and the number of multiplication operations is:

$$N_{mult} = \sum_{n=1}^{N} C_{n-1} * C_n * \Delta T * K_n \sim (O(NC^2 K \Delta T))$$

Nevertheless, firstly, it should be noted that for keeping the location of the input tensors for convolutions will require copying the following number of elements:

$$N_{copy} = \sum_{n=1}^{N} C_{n-1} K_n \sim O(NCK)$$

Secondly, the intermediate results may need to be stored from the previous step:

$$N_{memory} = \sum_{n=1}^{N} c_{n-1} * (\Delta T + T_{n-1}(m-1)) \sim O(NC\Delta T)$$

If $T_{n-1}(m-1) \approx \Delta T$, the amount of memory consumed may increase by approximately 2 times. In some embodiments, there is provided the ability to free and reallocate memory after calculating each layer. But in this case, 2N calls to a "memory manager" may be required. In the case of a standard CUDA RT manager, these calls can be very expensive. In addition, in more complex architectures, the calculation of several subsequent layers, and even the results of several previous iterations, may depend on a single result.

Streaming Memory Buffer

To that end, in some embodiments of the present technology, a streaming buffer may be used in a memory. This streaming buffer may be used as a layer-allocated memory space in the memory. How the streaming buffer may be implemented will now be described. The stream buffer of the size $T_{BUF} \times CcL$ with L cursors, can be defined as a following structure:

Tensor $X \in R^{T_{BUF} \times C}$ with a dense arrangement of elements in memory (possible variants T-major and C-major, in terms of cuDNN corresponding to NHWC and NCHW);

L integer indexes $\{t_1, . . . . t_L\}$, $t_i \in \overline{0, (T_{BUF} - 1)}$, called cursors. Indexes indicate the position of the cursor inside the buffer on a T axis. It should be noted that indexes can be counted from 0; and Oriented acyclic dependency graph with L vertices:

$$G_{dep} = <V_{dep}, E_{dep}>; V_{dep} = \overline{1,L}; E_{dep} \subset \overline{1,L}^2$$

The dependency graph defines the relationship between cursors. If the cursor i depends on the cursor j, i.e. <i, j>∈$E_{dep}$, this means that the invariant $t_i \le t_j$ is observed throughout the buffer's implementation.

In this case, a fragment (chunk) $X_{[b:e]} \in R^{(e-b) \times C}$ from the tensor X can be taken along the T axis and which can be used both as an input and output tensor during operations and without the need for additional copying of elements. The buffer workspace is the fragment between the first and last cursors and can be defined as:

$$X_{work} = X_{[min(\{t_1, \ldots, t_L\}):max(\{t_1, \ldots, t_L\})]}$$

It should be noted that only elements inside this workspace may be used for subsequent operations. The following operations may be allowed on the buffer:

initialization where indexes of all $t_1, \ldots t_L$ are set to 0.

Shifting/moving the cursor $t_i$ by a positive integer Δt to the right—that is, $t_i := t_i + \Delta t$ write or read any subset of elements from the workspace.

A few things are to be noted regarding cursor shifts/movement. First, the shifting should not violate the dependency relations between cursors, i.e. $\forall j:<i,j>\in E_{dep}, t_i + \Delta t \le t_j$. Second, if the new cursor position goes beyond the X tensor, i.e. $t_i + \Delta t \ge T_{BUF}$, the entire workspace can be said to be moved to the left, along with the contents and cursors, before this cursor is shifted:

b=min({$t_i, \ldots t_L$})
e=max({$t_i, \ldots t_L$})
$X_{t,c} := X_{t+b,c}, t \in \overline{0,(e-b-1)}, c \subseteq \overline{0,(C-1)}$
$t_j := t_j - b, j \in \overline{1,L}$ After this, the following shift can be performed: $t_i := t_i + \Delta t$.

However, after the shift, the size of the e−b workspace should not exceed $T_{BUF}$. If a primitive is used to copy tensor elements that does not allow the intersection between the source and output memory regions, this requirement may be stricter—that is, the size of the working area may not exceed half of the $T_{BUF}$.

Using Streaming Buffers in Combination with a Streaming CNN

How a streaming buffer may be used for a streaming CNN in some non-limiting embodiment of the present technology will now be described. When implementing a layer of a streaming CNN, buffers can be used for input and output data. With reference to FIG. 6, let it be assumed that input data of a layer will be in buffer 620 with cursors 626 and 628, and the output data will be in buffer 630 with cursors 636 and 638.

As such, the computations performed for a next iteration can occur in accordance with steps 602, 604, 606, 608, and 610. At step 602, both buffers can have a working area of length K (assuming that the next layer has the same convolution size as the current one). At step 604, the cursor 628 is moved by ΔT, and a new fragment of the workspace 620 is filled in with input values (values executed on the previous layer). At step 606, the cursor 638 is moved by ΔT, convolution on this layer is computed via the convolutional operation 552, and the result is written to a new fragment of the workspace 630. At step 508, the cursor 626 is moved by ΔT, reducing the working area of the buffer 620. At step 610, once data from the workspace 630 is read by the next layer in this iteration, the cursor 636 is moved by ΔT, reducing the workspace of buffer 630.

It should be noted that in a case of a multi-layered CNN, steps 604 and 608 for a given layer may correspond to steps 606 and 610 of a previous layer, and steps 606 and 610 for the given layer may correspond to steps 604 and 608 of a subsequent layer.

In such implementations, it should also be noted that a trade-off between memory use and time use can be regulated by the $T_{BUF}$ parameter such that:

$$N_{copy} = O\left(NCK\frac{\Delta T}{T_{BUF}}\right); \text{ and}$$

$$N_{memory} = O(NCT_{BUF})$$

In a first broad aspect of the present technology, there is provided a method of performing text-to-speech (TTS) processing of a textual input for generating an audio output. The audio output is to be provided to a user of an electronic device and comprises a plurality of sequential waveform segments. The electronic device is communicatively coupled to a server. A given one of the plurality of sequential waveform segments is to be generated in real-time during a respective in-use iteration of a trained Convolutional Neural Network (CNN). The CNN comprises at least a first hidden layer and a second hidden layer. The second hidden layer is sequential to the first hidden layer. The second hidden layer is configured to generate tensor data based on tensor data generated by the first hidden layer during a respective in-use iteration of the CNN. The method is executable by the server. The method comprises generating, by the server, CNN input data based on the textual input. The CNN input data is associated with respective timestamps. The timestamps are to be used for determining iteration-specific input data for a respective in-use iteration of the CNN. The method comprises, at a given in-use iteration of the CNN, generating, by the server employing the CNN, a given waveform segment of the audio output based on first iteration-specific data available for the given in-use iteration. The generating comprises storing, in a memory, first tensor data computed by the first hidden layer during the given in-use iteration. The first tensor data has tensor-chunk data. The tensor-chunk data (i) is used during the given in-use iteration for generating the given waveform segment of the audio output and (ii) is to be used during a next in-use iteration of the CNN for generating a next waveform segment of the audio output. The tensor-chunk data is identifiable by a start-position of the tensor-chunk data in the memory and an end-position of the tensor-chunk data in the memory. The method comprises, at the next in-use iteration of the CNN, generating, by the server employing the CNN, the next waveform segment of the audio output based on second iteration-specific data available for the next in-use iteration and a portion of the first iteration-specific data. The generating comprises storing, in the memory, second tensor data computed by the first hidden layer during the next in-use iteration. The second tensor data is stored in the memory sequentially to the first tensor data of the first hidden layer from the given in-use iteration. The second tensor data excludes a redundant tensor-chunk data. The redundant tensor-chunk data is identical to the tensor-chunk data from the first tensor data. The second tensor data is identifiable by a start-position of the second tensor data in the memory and an end-position of the second tensor data in the memory. The start-position of the second tensor data corresponds to the end-position of the tensor-chunk data in the memory. The generating also comprises applying, by the server, a convolution filter of the second hidden layer on (i) the tensor-chunk data from the first tensor data and (ii) the second tensor data stored in the memory, thereby generating third tensor data by the second hidden layer to be stored in the memory. The third tensor data is used for generating the next waveform segment of the audio output. The generating also comprises storing, by the server, the third tensor data in the memory.

In some embodiments of the method, the CNN input data is in a form of a spectrogram.

In some embodiments of the method, the CNN input data is generated by an other trained model, the other trained model configured to transform textual input into a spectrogram output.

In some embodiments of the method, the memory is from a GPU-type memory device.

In some embodiments of the method, the first hidden layer has an activation function. The tensor-chunk data from first tensor data generated during the given in-use iteration is an output of the activation function.

In some embodiments of the method, a size of the first tensor data in the memory depends on an amount of iteration-specific data available for the given in-use iteration.

In some embodiments of the method, a size of the second tensor data in the memory depends on an amount of the second iteration-specific data available for the next in-use iteration.

In some embodiments of the method, a size of the tensor-chunk data in the memory has been determined based on hyper parameters of the convolutional filter of the second hidden layer.

In some embodiments of the method, the hyper parameters include at least some of: a kernel size parameter, a stride parameter, and a dilation parameter.

In some embodiments of the method, the memory comprises a layer-dedicated memory space for a respective hidden layer of the CNN. The layer-dedicated memory space is defined by boundaries in the memory. A first boundary is indicative of a start-position of the respective layer-dedicated memory space in the memory and a second boundary is indicative of an end-position of the respective layer-dedicated memory space in the memory. The layer-dedicated memory space for a respective hidden layer is configured to store tensor data generated by the respective hidden layer during in-use iterations of the CNN.

In some embodiments of the method, a pair of flags associated with a first layer-dedicated memory space for the first hidden layer are used when storing data generated by the first hidden layer. The pair of flags is within the boundaries of the first layer-dedicated memory space. A pair of other flags associated with a second layer-dedicated memory space for the second hidden layer are used for storing data generated by the second hidden layer, The pair of other flags is within the boundaries of the second layer-dedicated memory space.

In some embodiments of the method, the pair of flags comprises a first flag and a second flag and the pair of other flags comprise a third flag and a fourth flag. After the given in-use iteration, (i) the first flag is located a first position corresponding to the start-position of the tensor-chunk data in the memory and the second flag is located at a second position corresponding to the end-position of the tensor-chunk data in the memory, and (ii) the third flag is located at a third position in the second layer-dedicated memory space and the fourth flag is located at a fourth position in the second layer-dedicated memory space. During the next in-use iteration, the storing the second tensor data computed by the first hidden layer comprises moving the second flag to a new second position in the memory. The second tensor data is stored in the memory between the second position and the new second position. The tensor-chunk data and the second tensor data are stored sequentially in the memory between the first position of the first flag corresponding to the start-position of the tensor-chunk data and the new second position of the second flag. During the next in-use iteration, the applying the convolutional filter on (i) the tensor-chunk data from the first tensor data and (ii) the second tensor data comprises applying the convolutional filter on data stored in the memory between the first position of the first flag and the new second position of the second flag. During the next in-use iteration, the storing the third tensor data in the memory comprises moving the fourth flag to a new fourth position in the memory. The third tensor data is stored in the memory between the fourth position and the new fourth position.

In a second broad aspect of the present technology, there is provided a server for performing text-to-speech (TTS) processing of a textual input for generating an audio output. The audio output is to be provided to a user of an electronic device and comprises a plurality of sequential waveform segments. The electronic device is communicatively coupled to the server. A given one of the plurality of sequential waveform segments is to be generated in real-time during a respective in-use iteration of a trained Convolutional Neural Network (CNN). The CNN comprises at least a first hidden layer and a second hidden layer. The second hidden layer is sequential to the first hidden layer. The second hidden layer is configured to generate tensor data based on tensor data generated by the first hidden layer during a respective in-use iteration of the CNN. The server is configured to generate CNN input data based on the textual input. The CNN input data is associated with respective timestamps. The timestamps are to be used for determining iteration-specific input data for a respective in-use iteration of the CNN. The server is configured to, at a given in-use iteration of the CNN, generate, by employing the CNN, a given waveform segment of the audio output based on first iteration-specific data available for the given in-use iteration. To generate comprises the server configured to store, in a memory, first tensor data computed by the first hidden layer during the given in-use iteration. The first tensor data has tensor-chunk data. The tensor-chunk data (i) is used during the given in-use iteration for generating the given waveform segment of the audio output and (ii) is to be used during a next in-use iteration of the CNN for generating a next waveform segment of the audio output. The tensor-chunk data is identifiable by a start-position of the tensor-chunk data in the memory and an end-position of the tensor-chunk data in the memory. The server is configured to, at the next in-use iteration of the CNN, generate, by employing the CNN, the next waveform segment of the audio output based on second iteration-specific data available for the next in-use iteration and a portion of the first iteration-specific data. To generate comprises the server configured to store, in the memory, second tensor data computed by the first hidden layer during the next in-use iteration. The second tensor data is stored in the memory sequentially to the first tensor data of the first hidden layer from the given in-use iteration. The second tensor data excludes a redundant tensor-chunk data, the redundant tensor-chunk data being identical to the tensor-chunk data from the first tensor data. The second tensor data is identifiable by a start-position of the second tensor data in the memory and an end-position of the second tensor data in the memory. The start-position of the second tensor data corresponds to the end-position of the tensor-chunk data in the memory. To generate comprises the server configured to apply a convolution filter of the second hidden layer on (i) the tensor-chunk data from the first tensor data and (ii) the second tensor data stored in the memory, thereby generating third tensor data by the second hidden layer to be stored in the memory. The third tensor data is used for generating the next waveform segment of the audio output. To generate comprises the server configured to store the third tensor data in the memory.

In some embodiments of the server, the CNN input data is in a form of a spectrogram.

In some embodiments of the server, the CNN input data is generated by an other trained model, the other trained model configured to transform textual input into a spectrogram output.

In some embodiments of the server, the memory is from a GPU-type memory device.

In some embodiments of the server, the first hidden layer has an activation function. The tensor-chunk data from the first tensor data generated during the given in-use iteration is an output of the activation function.

In some embodiments of the server, a size of the first tensor data in the memory depends on an amount of iteration-specific data available for the given in-use iteration.

In some embodiments of the server, a size of the second tensor data in the memory depends on an amount of the second iteration-specific data available for the next in-use iteration.

In some embodiments of the server, a size of the tensor-chunk data in the memory has been determined based on hyper parameters of the convolutional filter of the second hidden layer.

In some embodiments of the server, the hyper parameters include at least some of: a kernel size parameter, a stride parameter, and a dilation parameter.

In some embodiments of the server, the memory comprises a layer-dedicated memory space for a respective hidden layer of the CNN. The layer-dedicated memory space is defined by boundaries in the memory. A first boundary is indicative of a start-position of the respective layer-dedicated memory space in the memory and a second boundary is indicative of an end-position of the respective layer-dedicated memory space in the memory. The layer-dedicated memory space for a respective hidden layer is configured to store tensor data generated by the respective hidden layer during in-use iterations of the CNN.

In some embodiments of the server, a pair of flags associated with a first layer-dedicated memory space for the first hidden layer are used when storing data generated by the first hidden layer. The pair of flags is within the boundaries of the first layer-dedicated memory space. A pair of other flags associated with a second layer-dedicated memory space for the second hidden layer are used for storing data generated by the second hidden layer. The pair of other flags is within the boundaries of the second layer-dedicated memory space.

In some embodiments of the server, the pair of flags comprises a first flag and a second flag and the pair of other flags comprise a third flag and a fourth flag. After the given in-use iteration, (i) the first flag is located a first position corresponding to the start-position of the tensor-chunk data in the memory and the second flag is located at a second position corresponding to the end-position of the tensor-chunk data in the memory, (ii) the third flag is located at a third position in the second layer-dedicated memory space and the fourth flag is located at a fourth position in the second layer-dedicated memory space. During the next in-use iteration, to store the second tensor data computed by the first hidden layer comprises the server configured to move the second flag to a new second position in the memory. The second tensor data is stored in the memory between the second position and the new second position. The tensor-chunk data and the second tensor data are stored sequentially in the memory between the first position of the first flag corresponding to the start-position of the tensor-chunk data and the new second position of the second flag. During the next in-use iteration, to apply the convolutional filter on (i) the tensor-chunk data from the first tensor data and (ii) the second tensor data comprises the server configured to apply the convolutional filter on data stored in the memory between the first position of the first flag and the new second position of the second flag. During the next in-use iteration, to store the third tensor data in the memory comprises the server configured to move the fourth flag to a new fourth position in the memory. The third tensor data is stored in the memory between the fourth position and the new fourth position.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
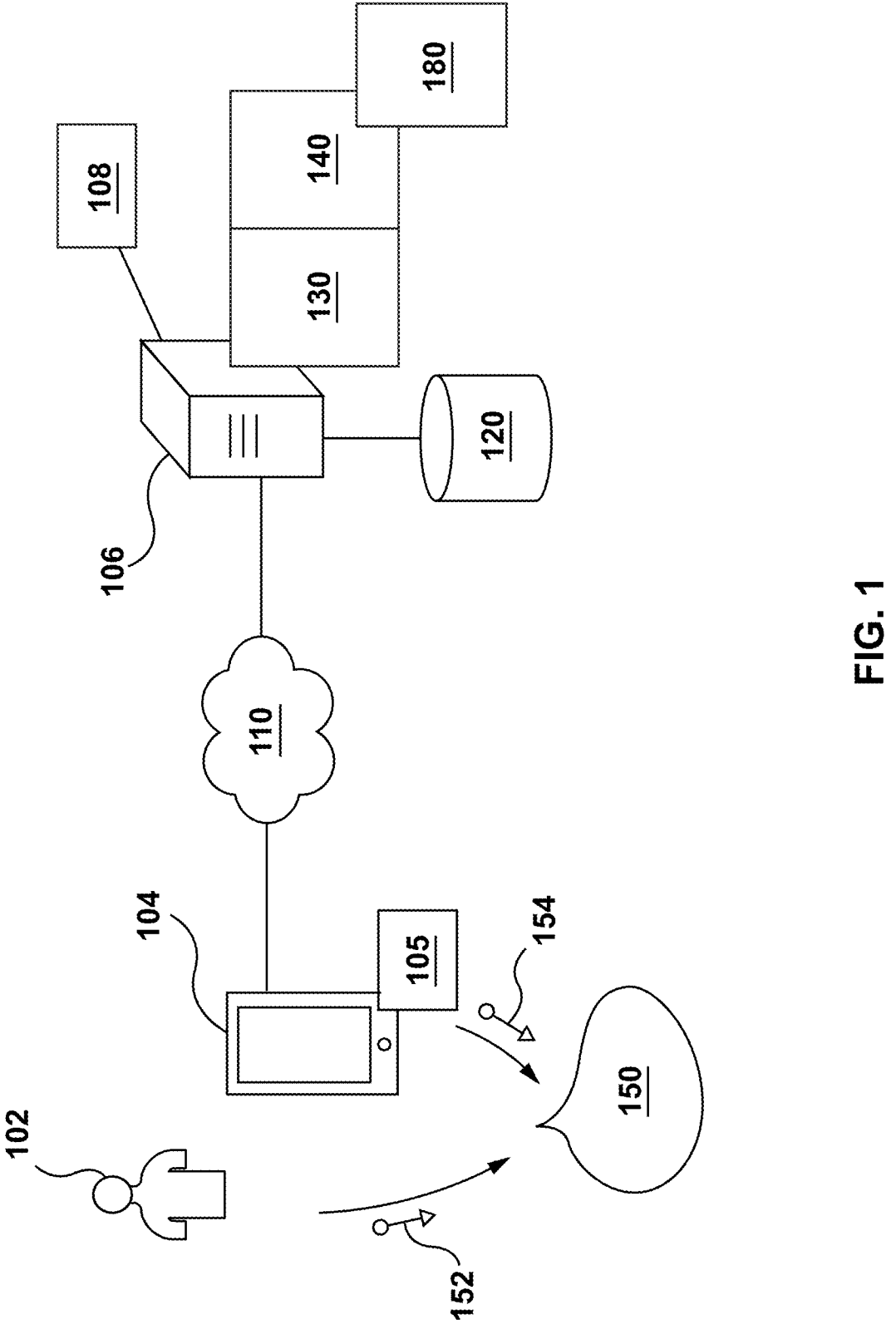
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide responses to user queries, which can be said to result in a "conversation" between a given user and a given electronic device. For example, a sound indication 152 (such as spoken utterance) from a user 102 may be detected by an electronic device 104 (or simply a "device 104"), which, in response, is configured to provide a sound indications 154 (such as spoken utterances or "machine-generated utterance"). As such, it can be said that this results in a conversation 150 between the user 102 and the device 104, where the conversation 150 is composed of (i) the sound indication 152 and (ii) the sound indication 154.

Various components of the system 100 and how these components may be configured for implementing the provision of the sound indication 154 by the electronic device 104 in response to the sound indication 152 of the user 102 will now be described.

User Device

As previously mentioned, the system 100 comprises the device 104. The implementation of the device 104 is not particularly limited, but as an example, the device 104 may be implemented as a personal computer (desktops, laptops, netbooks, etc.), a wireless communication device (such as a smartphone, a cell phone, a tablet, a smart speaker and the like), as well as network equipment (such as routers, switches, and gateways). As such, the device 104 can sometimes be referred to as an "electronic device", "end user device", "client electronic device" or simply "device". It should be noted that the fact that the device 104 is associated with the user 102 does not need to suggest or imply any mode of operation—such as a need to log in, a need to be registered, or the like.

It is contemplated that the device 104 comprises hardware and/or software and/or firmware (or a combination thereof), as is known in the art, in order to (i) detect or capture the sound indication 152 and (ii) to provide or reproduce the sound indication 154. For example, the device 104 may comprise one or more microphones for detecting or capturing the sound indications 152 and one or more speakers for providing or reproducing the sound indications 154.

The device 104 also comprises hardware and/or software and/or firmware (or a combination thereof), as is known in the art, in order to execute an Intelligent Personal Assistant (IPA) application 105. Generally speaking, the purpose of the IPA application 105, also known as a "chatbot", is to enable the user 102 to submit queries in a form of spoken utterances (e.g., the sound indication 152) and, in response, provide to the user 102 responses in a form of spoken utterances (e.g., the sound indication 154).

Submission of queries and provision of responses may be executed by the IPA application 105 via a natural language user interface. Generally speaking, the natural language user interface of the IPA application 105 may be any type of computer-human interface where linguistic phenomena such as verbs, phrases, clauses and the like act as user interface controls for extracting, selecting, modifying or otherwise generating data in the IPA application 105.

For example, when spoken utterances of the user 102 (e.g., the sound indication 152) are detected (i.e. captured) by the device 104, the IPA application 105 may employ its natural language user interface in order to analyze the spoken utterances of the user 102 and extract data therefrom which is indicative of user queries. Also, data indicative of responses received by the device 104, is analyzed by the natural language user interface of the IPA application 105 in order to provide or reproduce spoken utterances (e.g., the sound indication 154) indicative of those responses.

In at least some embodiments of the present technology, as it will become apparent from the description herein below, the electronic device 104 may be configured to receive data for generating the sound indication 154 in segments. In other words, this means that the system 100 may be configured to generate waveform segments in real-time for reproducing of the sound indication 154 for the user 102, which allows increasing the responsiveness of the IPA application 105.

Communication Network

In the illustrative example of the system 100, the device 104 is communicatively coupled to a communication network 110 for accessing and transmitting data packets to/from a server 106 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

Server

As previously mentioned, the system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Broadly speaking, the server 106 is configured to (i) receive data associated with the sound indication 152 from the device 104, (ii) analyze this data and, in response, (iii) determine data for generating the sound indication 154. For example, the server 106 may be configured to process data indicative of a user query, and in response, may be configured to generate data indicative of a response to that user query. It can be said that the server 106 may be configured to (i) execute one or more computer-implemented procedures that are referred to herein as a "search engine" 130 for determining the content of the response to be provided to the user 102, and (ii) execute one or more computer-implemented procedures that are referred to herein as a "text-to-speech (TTS) engine" 140.

In some embodiments, the server 106 may be under control and/or management of a search engine provider (not depicted) such as, for example, an operator of the Yandex™ search engine. As such, the server 106 may be configured to host the search engine 130 for performing one or more searches responsive to queries submitted by users of the search engine 130.

In some embodiments, the server 106 may receive data from the device 104 indicative of the query of the user 102. For example, the IPA application 105 of the device 104 may be configured to generate a digital audio representation of the sound indication 152 (e.g., the user utterance) and transmit this digital audio representation via the communication network 110 to the server 106. In this example, the server 106 may be configured to generate a textual representation of the query submitted by the user 102 based on the digital audio representation of the user utterance and perform a search based on the so-generated textual representation of the query.

It should be noted that speech-to-text (STT) processing of the digital audio representation of the user utterance may be performed locally on the device 104 (by the IPA application 105, for example) and, hence, additionally or alternatively, the device 104 may be configured to transmit the textual representation of the query to the server 106 in addition to, or instead of, the digital audio representation.

As mentioned above, the server 106 may use the textual representation of the query to perform a search (responsive to the query) and thereby generate search results that are relevant to the query. For example, the server 106 employing the search engine 130 may be configured to generate data indicative of one or more search results relevant to the query of the user 102. The search engine 130 may be configured to determine content resources that are relevant to the user query, and rank these content resources based on inter alia the relevance of their content to the query as is known in the art.

Irrespective of a specific manner in which the content of the response is determined by the server 106, the server 106 may be configured to use the TTS engine 140 in order to generate an "audio output" representative of that content, and provide it in real-time to the electronic device 104 for reproduction to the user 102 as the sound indication 154. In some non-limiting embodiments of the present technology, one of the components of the TTS engine 140 is a Convolutional Neural Network (CNN) 180 that allows to iteratively generate segments of the audio output in real-time based on a textual input.

Generally speaking, NNs are a specific class of Machine Learning Algorithms (MLAs) that consist of interconnected groups of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine a complex statistical arrangements or mathematical algorithms for a given situation; the given NN tries to provide an "intuitive" answer based on a "feeling" for a situation. A given NN is thus a kind of a trained "black box", which can be used in a situation when what is in the "box" can be less important; and where having the "box" provide reasonable answers to given inputs being more important. For example, NNs are commonly used to optimize the distribution of web-traffic between servers and in data processing, including filtering, clustering, signal separation, compression, vector generation and the like.

CNNs are a specific class of deep NNs most commonly applied to analyzing visual imagery but have also been used for TTS processing. Typically, CNNs can be said to employ a mathematical operation called "convolution" that is a specialized kind of linear operation. It can also be said that CNNs are NNs that use convolution, in place of general matrix multiplication, in at least one of their layers.

In fact, CNNs comprise an input and an output layer, as well as multiple "hidden layers". The hidden layers of a CNN typically consist of a series of convolutional layers that "convolve" with a multiplication or other dot product. They can also include activation functions (RELU layer, for example) followed by additional convolutions such as pooling layers, fully connected layers and normalization layers, generally referred herein to as hidden layers because their inputs and outputs are masked by the activation function and/or convolution.

Broadly speaking, input to a CNN is a tensor having a size. For example, the size of the tensor may be defined by, for example, height, width and depth. Once input tensor "passes through" a convolutional layer, this input tensor is abstracted to a feature map of its own size. It can be said that a convolutional layer can include the following features: convolutional kernel size defined by a width and height (hyper-parameters), number of input channels and output channels (hyper-parameters), and the like. Then, the convolutional layer convolves the data and "passes" its result to the next layer, and so forth.

It should be noted that neurons of a convolutional layer can be configured to process data for its respective "receptive field". For example, a first layer of neurons in a CNN is composed of all the input neurons. However, neurons in the next layer may receive connections from some of the input neurons, but not all. Hence, instead of having each neuron receive connections from all neurons in the previous layer, CNNs can use a "receptive field-like layout" in which each neuron receives connections only from a subset of neurons in the previous (lower) layer. The receptive field of a neuron in one of the lower layers encompasses only a small portion of the input, while the receptive field of a neuron in subsequent (higher) layers involves a combination of receptive fields from several (but not all) neurons in the layer before. In this way, each successive layer is capable of learning, in a sense, increasingly abstract features of the original input. The use of receptive fields in this fashion is can be said to give CNNs an advantage in recognizing visual, and auditory patterns, when compared to other types of NNs.

One example of CNNs being used for TTS processing is "WaveNet", which is a deep generative model of raw audio waveforms. WaveNets are able to generate speech which mimics human voices and which sounds more natural than some conventional TTS systems. Broadly speaking, WaveNets are CNNs where the convolutional layers have various "dilation" factors that allow its receptive field to grow exponentially with depth and cover thousands of timesteps.

In summary, the implementation of the CNN 180 by the server 106 can be broadly categorized into two phases—a training phase and an in-use phase. First, the CNN 180 is trained in the training phase. Then, once the CNN 180 knows what data to expect as inputs and what data to provide as outputs, the CNN 180 is actually run using in-use data in the in-use phase. How the server 106 is configured to train and then use the CNN 180 to generate an audio output representation based on a textual representation of content will be described in greater details herein further below.

Memory Device

The server 106 may have access to a memory device 108. As it will become apparent from the description herein further below, the server 106 is configured to use the memory device 108 in order to store data processed by at least some components of the TTS engine 140. In some embodiments, the memory device 108 may be integral to the server 106. However, it is contemplated that the memory device 108 may be a remote memory device from the server 106, without departing from the scope of the present technology.

In at least one embodiments of the present technology, the memory device 108 may a "Graphical Processing Unit" (GPU) device. Broadly speaking, a GPU device comprises a specialized processor with dedicated memory that conventionally performs floating point operations required for rendering graphics. GPU-type memory devices can be optimized for deep learning models as they can process multiple computations simultaneously. In other words, deep learning models can be trained faster using GPU-type memory devices, as opposed to "Central Processing Unit" (CPU) type devices, by running operations in parallel (at the same time), instead of sequentially (one after the other).

Indeed, GPU-type memory devices can have a large number of cores, which allows for better computation of multiple parallel processes. Additionally, computations in deep learning need to handle huge amounts of data which makes bandwidth of GPU-type memory devices most suitable.

In fact, a few parameters may make GPUs more advantageous than CPUs for deep learning applications. Bandwidth is one of the main reasons why GPUs are faster for computing than CPUs. With large datasets, CPUs take up a lot of memory while training the model. On the one hand, computing huge and complex tasks take up a lot of clock cycles in a CPU-type memory device. CPUs take up jobs sequentially and have comparatively fewer cores. On the other hand, GPUs come with dedicated VRAM (Video RAM) memory. Also, training a model in deep learning requires a large dataset, hence the large computational operations in terms of memory. To compute the data efficiently, a GPU-type memory device may be a more suitable choice—the larger the number of computations, the more the advantage a GPU-type memory device can have over a CPU-type memory device.

As it will become apparent from the description herein further below, the memory device 108 may be configured to provide "layer-dedicated" memory space that are allocated to respective layers of the CNN 180. This may allow re-using memory space storing data that is no longer needed during a given in-use phase. How the memory device 108 is configured and how layer-dedicated memory spaces are implemented will be discussed in greater details herein further below.

Database System

The server 106 is communicatively coupled to a database system 120. Generally speaking, the database system 120 is configured to store information extracted and/or generated by the server 106 during processing. For example, the database system 120 may receive data from the server 106 which was extracted and/or generated by the server 106 during processing for temporary and/or permanent storage thereof and may provide stored data to the server 106 for further use thereof.

In some embodiments, the database system 120 is configured to store search engine data. Generally speaking, the search engine data stored in the database system 120 may comprise data that enables the server 106 to provide search engine services to users of the search engine 130. In some embodiments, the search engine data may comprise data about a large number of content resources (e.g., documents) that have been retrieved by a crawler application (not depicted). As such, the database system 120 may provide the server 106 with access to this larger number of documents during document retrieval operations.

It should be noted that the server 106 may be configured to execute the crawler application as part of the search engine 130. Broadly speaking, the crawler application may be used by the server 106 in order to "visit" resources accessible via the communication network 110 and to retrieve/download them for further use. For example, the crawler application may be used by the server 106 in order to access a plurality of resource servers (not depicted) and to retrieve/download documents representative of web pages hosted by the plurality of resource servers. It is contemplated that the crawler application may be periodically executable by the server 106 in order to retrieve/download documents that have been updated and/or became accessible over the communication network 110 since a previous execution of the crawler application.

It should be noted that the data about the large number of content resources may be stored in the database system 120 in an indexed format—that is, the database system 120 may be configured to store an indexing structure, such as an inverted index of content resources as known in the art. For example, the database system 120 may store a plurality of posting lists associated with respective terms (e.g., words) that have been identified in the content of the content resources. A given posting list basically references a plurality of content resources that include within their content the corresponding term.

In some embodiments, the search engine data stored in the database system 120 may comprise information about previously performed searches by the search engine 130. For example, the search engine data may comprise query data associated with respective queries. It is also contemplated that the search engine data stored in the database system 120 may also comprise information about content resources that have been provided by the search engine 130 as search results. Resource data associated with a given content resource may be of different types and is not limiting.

The database system 120 is also configured to store spectrogram data and waveform data. Broadly speaking, spectrogram data and waveform data may be used by the server 106 for training the CNN 180 of the TTS engine 140. In at least some non-limiting embodiments of the present technology, spectrogram data and waveform data may be stored in a paired manner—that is, the database system 120 may be configured to store "spectrogram-waveform" pairs which have been generated based on common spoken utterances. For example, waveform data from a given pair may be an audible representation of a corresponding utterance (in an audio format), whereas the spectrogram data from the given pair may be a 2D representation (e.g., audio frequency over time) of the corresponding utterance (in 2D format).

As mentioned above, CNNs are also used to perform TTS processing. In such a setting, instead of using 2D image data as in a computer vision setting, CNNs are trained on 2D sound data representative of an utterance. That is, the server 106 may be configured to train the CNN 180 based on spectrogram-like representations of sound.

Broadly speaking, during the training of the CNN 180, the server 106 may be configured to retrieve spectrogram-waveform pairs from the database system 120 and use them as training sets for executing a large number of training iterations. The server 106 is configured to generate an input based on the spectrogram data and provide it to the CNN 180, which in response generates an output. This output is compared to the waveform data from the respective spectrogram-waveform pair (prediction vs. target). Based on that comparison, the server 106 may generate one or more scores for "adjusting" the CNN 180 to make better predictions of waveform data based on spectrogram data.

Additional details regarding the training phase of the CNN 180 will be omitted for the sake of simplicity. Suffice it to state that a variety of training procedures may be performed on the CNN 180 based on similar training datasets to those described above. Nonetheless, it should be noted that developers of the present technology have devised methods and systems which allow the CNN 180 to generate audio outputs in a more efficient manner during the in-use phase thereof.

More particularly, as it will be described in greater detail herein further below, in at least some embodiments of the present technology, the server 106 may be configured to employ the CNN 180 during its in-use phase in a way that allows (i) reducing a total number of computational operations performed by the CNN 180 for generating a given audio output, and (ii) reducing a total amount of memory space required for storing internally-processed data by the CNN 180 when generating the given audio output. Hence, employing the CNN 180 during its in-use phase as contemplated in some embodiments of the present technology may result in a technical effect of a quicker provision of the sound indication 154 to the user 102 (due to a fewer number of computations performed) and/or reduced amount of memory resources required for generation of the audio output.

TTS Engine

How the server 106 may be configured to use a textual input 200 for generating input data for the CNN 180 will now be described with reference to FIG. 2. The server 106 may acquire the textual input 200 in a variety of ways. In one non-limiting example, the textual input 200 may be representative of content to be provided as a response/answer to a user query (form the spoken user utterance). As such, in some embodiments, the server 106 may generate the textual input 200 by employing the search engine 130.

Irrespective of how the server 106 acquires and/or generates the textual input 200, the purpose is to process the textual input 200 by the TTS engine 140 for generating an audio output 350 (being in audio representation of the textual input 200) so that it can be provided to the user 102 as a machine-generated utterance. To that end, the TTS engine 140 comprises a text-to-spectrogram procedure 202 which, when executed by the server 106, is configured to generate a spectrogram 204 based on the textual input 200.

How the text-to-spectrogram procedure 202 is implemented is not particularly limited. In one non-limiting example, the server 106 may be configured to use a given MLA that has been trained to generate spectrogram data based on textual inputs. In one non-limiting implementation of the present technology, the text-to-spectrogram procedure 202 may be implemented via a "Tacotron", which is a sequence-to-sequence machine learning architecture for producing magnitude spectrograms from a sequence of characters. In some embodiments, the spectrogram 204 may be a MEL spectrogram, meaning that one of the axes on the spectrogram has a MEL scale.

It should be noted that the server 106 is configured to use data from the spectrogram 204 to generate CNN input data 208 comprising a plurality of iteration-specific datasets. For example, the server 106 may be configured to perform an in-use pre-processing procedure 206, during which the server 106 splits information from the spectrogram 204 according to one or more time intervals and thereby generates first iteration-specific data 210, second iteration-specific data 220, third iteration-specific data 230, and fourth iteration-specific data 240. It should be noted that given iteration-specific data is associated with a respective time interval in the spectrogram 204. In other words, the server 106 may generate iteration-specific data based on timestamps from spectrogram data.

Figure 3:
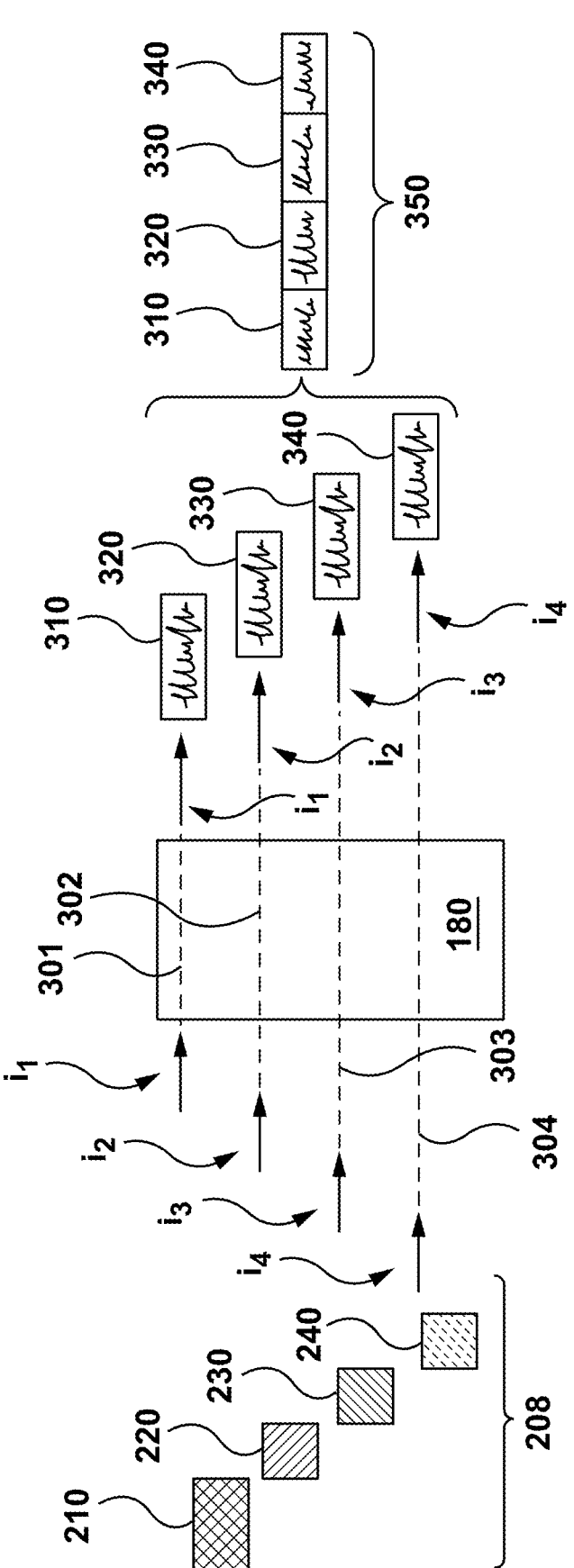
FIG. 3 is a schematic illustration of a sequence of in-use iterations of the CNN executed by the system of FIG. 1, in accordance with some non-limiting embodiments of the present technology.

As it will now be described with reference to FIG. 3, the server 106 may perform a number of in-use iterations of the CNN 180 for generating the audio output 350 for the textual input 200. As seen, in this case, the server 106 is configured to perform four in-use iterations of the CNN 180 for generating the audio output 350.

For example, at a first moment in time corresponding to a first in-use iteration 301, the server 106 inputs the first iteration-specific data 210 into the (trained) CNN 180 that is configured to generate a first waveform segment 310. In the same example, at a second moment in time corresponding to a second in-use iteration 302, the server 106 inputs the second iteration-specific data 220 into the CNN 180 that is configured to generate a second waveform segment 320. In the same example, at a third moment in time corresponding to a third in-use iteration 303, the server 106 inputs the third iteration-specific data 230 into the CNN 180 that is configured to generate a third waveform segment 330. In the same example, at a fourth moment in time corresponding to a fourth in-use iteration 304, the server 106 inputs the fourth iteration-specific data 240 into the CNN 180 that is configured to generate a fourth waveform segment 340. As such, the first waveform segment 310, the second waveform segment 320, the third waveform segment 330, and the fourth waveform segment 340, in that order, are representative of the audio output 350 generated by the CNN 180 for the textual input 200.

It should be noted that the first in-use iteration 301, the second in-use iteration 302, the third in-use iteration 303, and the fourth in-use iteration 304 are sequential to one another in time. In other words, in-use iterations in a set of in-use iterations (not numbered) performed by the server 106 for generating respective waveform segments of the audio output 350 are performed sequentially in time, and therefore, the respective waveform segments of the audio output 350 are generated sequentially in time.

It should also be noted that the server 106 may not need to wait until all in-use iterations in the set are completed before triggering transmission of the audio output 350 to the electronic device 104 (see FIG. 1) for reproduction as the sound indication 154. Indeed, as mentioned above, the server 106 may be configured to transmit the audio output 350 in segments in real-time to the electronic device 104— that is, for example, at the first moment in time when the first waveform segment 310 is generated, the server 106 may be configured to trigger transmission of the first waveform segment 310 to the electronic device 104 without needing the complete audio output 350 to be generated at that moment in time. As such, this may allow increasing the responsiveness of the IPA application 105 since less time elapses between the receipt of the sound indication 152 and the moment in time when the sound indication 154 starts to being provided (the first waveform segment 310).

Figure 2:
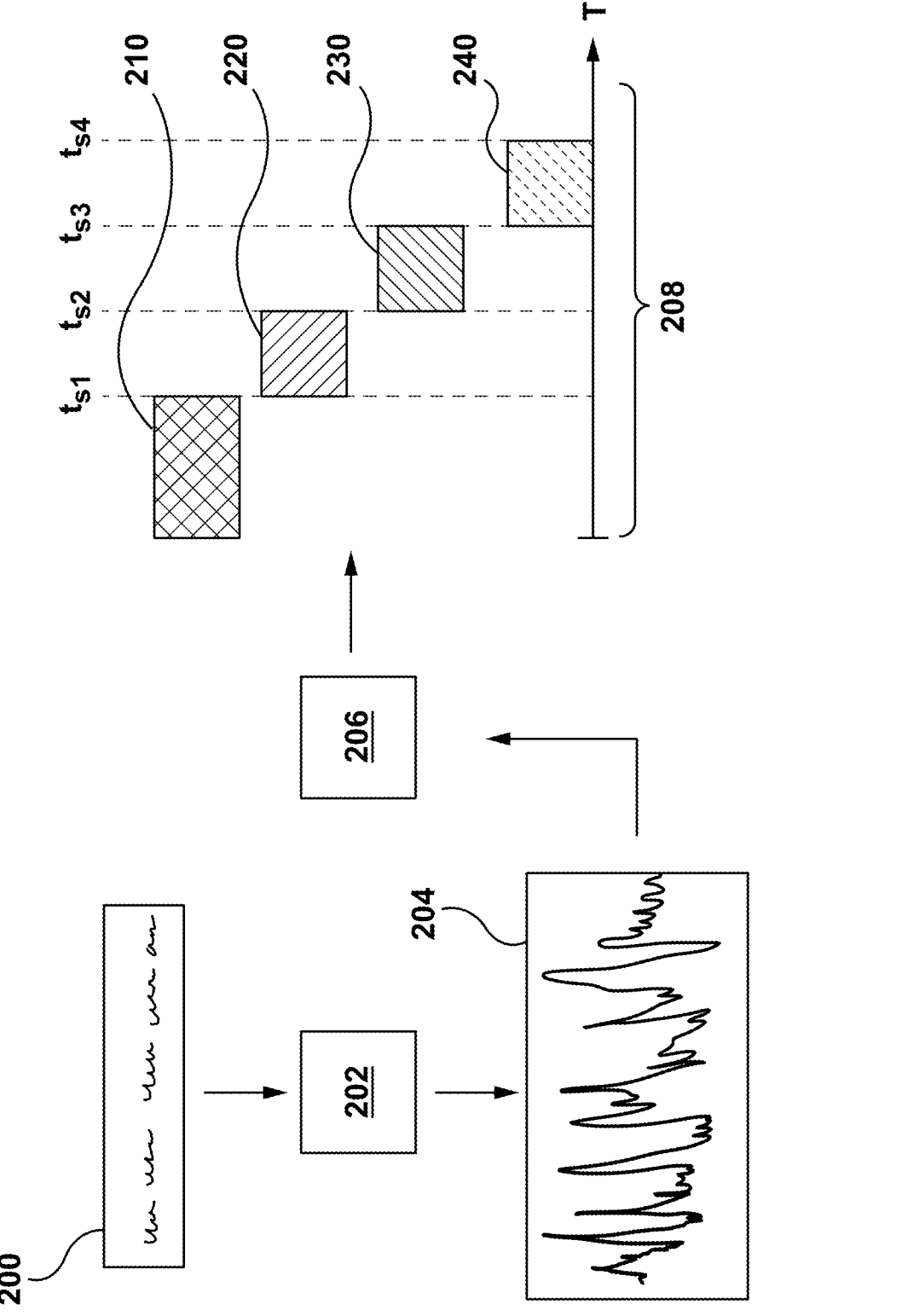
FIG. 2 is a schematic illustration of a process in which input data for a Convolutional Neural Network (CNN) executed by the system of FIG. 1 is generated, in accordance with some non-limiting embodiments of the present technology.

Also, the sequence in which iteration-specific data is inputted at respective in-use iterations into the CNN 180 corresponds to a sequence in which the iteration-specific data is found in the spectrogram 204 (see FIG. 2). As it will become apparent form the description herein below, during a given in-use iteration, in addition to a respective iteration-specific data inputted during that given in-use iteration, the CNN 180 may be configured to use at least a portion of previously inputted and processed iteration-specific data when generating a respective waveform segment. In other words, the CNN 180 may be configured to generate the second waveform segment 320 based on (i) the second iteration-specific data 220, and (ii) at least a portion of the first iteration-specific data 210 being internally available to the CNN 180, thus in a sense "re-using" the least the portion of the first iteration-specific data 210 being internally available to the CNN 180 rather than generating it anew.

How the server 106 may be configured to perform the first in-use iteration 301 and the second in-use iteration 302 (i.e., two sequential in-use iterations from the set of in-use iterations for generating the audio output 350) will now be described in greater detail with reference to FIG. 4. More particularly, in FIG. 4, there is depicted a representation 400 of the first in-use iteration 301, and a representation 490 of the second (subsequent) in-use iteration 302, which will now be discussed in turn.

Broadly speaking, during the first in-use iteration 301, (i) the server 106 provides the first iteration-specific data 210 to an input layer 402 of the CNN 180, (ii) the CNN 180 then processes this data via a plurality of hidden layers 410, and (iii) the server 106 acquires from an output layer 404 of the CNN 180 the first waveform segment 310.

It should be noted that the plurality of hidden layers comprises an $i^{th}$ hidden layer 420, a first hidden layer 430, a second hidden layer 440, and so forth. In the non-limiting example of FIG. 4, the first hidden layer 430 uses information computed by the $i^{th}$ hidden layer 420, that the second hidden layer uses information computed by the first hidden layer 430, and so forth. Hence, it can be said that the first hidden layer 430 and the second hidden layer 440 are sequential hidden layers of the CNN 180, since the second hidden layer 440 processes information computer by the first hidden layer 430.

It should also be noted that the first hidden layer 430 and a second hidden layer 440 are respective convolutional layers of the CNN 180. For example, as depicted in FIG. 4, the first hidden layer comprises a first convolutional filter 432, and the second hidden layer comprises a second convolutional filter 442. Broadly speaking, the first hidden layer 430 acquires tensor data computed by a previous hidden layer (in this case, the $i^{th}$ hidden layer 420) and which has been stored in the memory device 108, and applies the first convolutional filter 432 unto this tensor data for generating first tensor data 434. It should be noted that, although not illustrated for sake of simplicity, the first hidden layer 430 may also comprise an activation function that is applied onto the output of the first convolutional filter 432 in order to generate the first tensor data 434.

Furthermore, this first tensor data 434 stored in the memory device 108 is then used by the second hidden layer 440. For example, the second hidden layer 440 may apply the second convolutional filter 442 onto the first tensor data 434 stored in the memory 108 for generating other tensor data 444. It is contemplated that the second hidden layer 440 may be configured to process the first tensor data 434 similarly to how the first hidden layer 430 is configured to process the tensor data from the previous hidden layer, while applying the second convolutional filter 442 instead of the first convolutional filter 432. It is also contemplated that the other tensor data 444 may be processed by a subsequent hidden layer (to the second hidden layer 440) similarly to how the second hidden layer is configured to process the first tensor data 434 of the first hidden layer 430, and so forth.

It should be noted that the first tensor data 434 is tensor data stored in the memory device 108 for the first hidden layer 430 during the first in-use iteration 301, and that the other tensor data 444 is tensor data stored in the memory device 108 for the second hidden layer 440 during the first in-use iteration 301. In at least some embodiments of the present technology, it is contemplated that a size of the first tensor data 434 when stored in the memory 108 may depend on an amount of iteration-specific data available for the first in-use iteration 301—i.e., a size of the first tensor data 434 may depend on an amount of data in the first iteration-specific data 210.

Developers of the present technology, have realized that a portion of the first tensor data 434 stored for the first hidden layer 430 during the first in-use iteration 301 is the same as (identical to) a portion of tensor data to be computed by the first hidden layer 430 during the second (sequential) in-use iteration 302. As such, as it will become apparent to a person skilled in the art having appreciated the present disclosure, developers of the present technology have devised methods and systems where a portion of the first tensor data 434 stored in the memory 108 can be re-used during the second in-use iteration 302, instead of being re-calculated anew. Indeed, developers of the present technology have realized that, since a portion of tensor data that ought to be computed by the first hidden layer 430 during the second in-use iteration 302 is identical or at least substantially identical) to a given portion of the first tensor data 434 computed during the first in-use iteration 301, it is advantageous to re-use (as opposed to re-calculate) this portion during the second in-use iteration 302. As mentioned above, employing CNNs for TTS processing may require large amounts of computational resources, and therefore, avoiding redundant computations results in a more efficient resource management.

Figure 4:
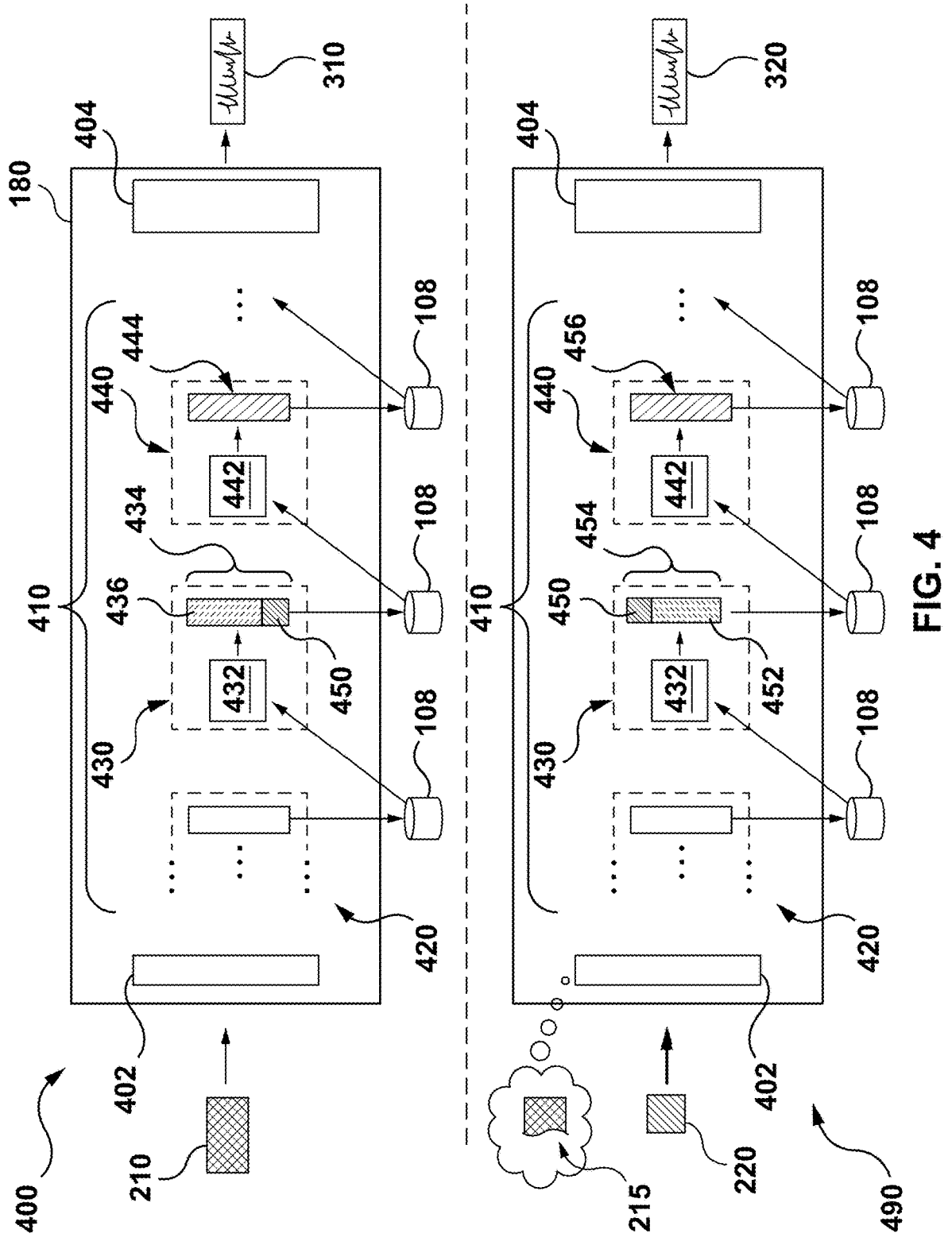
FIG. 4 is a schematic illustration of a first in-use iteration and of a subsequence in-use iteration of the CNN executed by the system of FIG. 1, in accordance with some non-limiting embodiments of the present technology.

Returning to the description of FIG. 4, it should be noted that the first tensor data 434 comprises a portion 436 and a tensor-chunk data 450. In the context of the present specification, the tensor-chunk data 450 refers to a portion of the first tensor data 434 that can be identified and re-used during a subsequent in-use iteration, instead of being re-computed anew by the first hidden layer 430. It should also be noted that the tensor-chunk data 450 is a "latest portion" of the first tensor data 434 when "stored" in the memory device 108.

In at least some embodiments of the present technology, it is contemplated that a size of the tensor-chunk data 450 that is to be re-used can be determined based on a hyper-parameter of the second convolutional filter 442 of the second hidden layer 440. In one non-limiting example, the hyper-parameters of the second convolutional filter 442 may comprise at least one of: a kernel size parameter, a stride parameter, and a dilation parameter. It is also contemplated that the location of the tensor-chunk data 450 in the memory 108 can be identified as a latest portion of the first tensor data 434 having a pre-determined size (e.g., determined based on the hyper-parameters of the second convolutional filter 442) when stored in the memory device 108.

The server 106 is configured to perform the second in-use iteration 302 as illustrated by the representation 490. Broadly speaking, during the second in-use iteration 302 (i) the server 106 provides the second iteration-specific data 220 to the input layer 402 of the CNN 180, (ii) the CNN 180 processes this data via the plurality of hidden layers 410, and (iii) the server 106 acquires from the output layer 404 of the CNN 180 the second waveform segment 320. However, it should be noted that in some embodiments of the present technology, in addition to the second iteration-specific data 220, the CNN 180 can further use a portion 215 of the first iteration-specific data 210, which is internally available to the CNN 180, during the second in-use iteration 302.

During the second in-use iteration 302, the first hidden layer 430 acquires tensor data computed by a previous hidden layer (in this case, the i$^{th}$ hidden layer 420) and which is stored in the memory device 108, and applies the first convolutional filter 432 onto this tensor data for generating second tensor data 452. It should be noted that in this case, the second hidden layer 440 may apply the second convolutional filter 442 onto both (i) the second tensor data 452 and (ii) the tensor-chunk data 450 from the previous in-use iteration. In other words, during the second in-use iteration 302, the first hidden layer 430 computes only the second tensor data 452, but the input into the second hidden layer 440 can be said to be "augmented" tensor data 454 comprising (i) the second tensor data 452 from the second in-use iteration of the first hidden layer 430 and (ii) the tensor-chunk data 450 from the first in-use iteration of the first hidden layer 430.

It is contemplated that during the second in-use iteration 302, the first hidden layer 430 is configured to generate only the second tensor data 452, even if the second hidden layer 440 is to process the augmented tensor data 454. This is due to the fact that in the context of the present technology, during the second in-use iteration 302, the first hidden layer 430 only needs to compute the second tensor data 452, without performing redundant computations for generating redundant data that is identical the tensor-chunk data 450. Therefore, it can be said that the input into the second hidden layer 440 during the second in-use iteration 302 comprises (i) the second tensor data 452 generated by the first hidden layer 430 during the second in-use iteration 302 and (ii) the tensor-chunk data 450 generated by the first hidden layer 430 during the first in-use iteration 301.

Again, as mentioned above, avoiding computation of redundant data by the first hidden layer 430 during the second in-use iteration 302 (i.e., the tensor-chunk data 450 that has already been stored in the memory 108) results in a lesser number of computational operations required by the server 106 for generating the second waveform segment 320.

For that reason, in at least some embodiments of the present technology, the first hidden layer 430 is configured to generate the second tensor data 452 during the second in-use iteration 302 which excludes "redundant tensor-chunk data" that is identical (or substantially identical) to the tensor-chunk data 450 from the first tensor data 434. Indeed, having the first hidden layer 430 so-configured to generate the second tensor data 452 without the redundant tensor-chunk data requires less computational operations than generating both the second tensor data 452 and the redundant tensor-chunk data.

It should be noted that the second convolutional filter 442 of the second hidden layer 440 is applied onto the augmented tensor data 454 for generating the third tensor data 456. Thus, it can be said that the second convolutional filter 442 of the second hidden layer 440 is applied onto tensor-chunk data 450 computed during a previous in-use iteration and onto the second tensor data 452 computed during a current in-use iteration (which excludes redundant tensor-chunk data identical to the tensor-chunk data 450).

Figure 5:
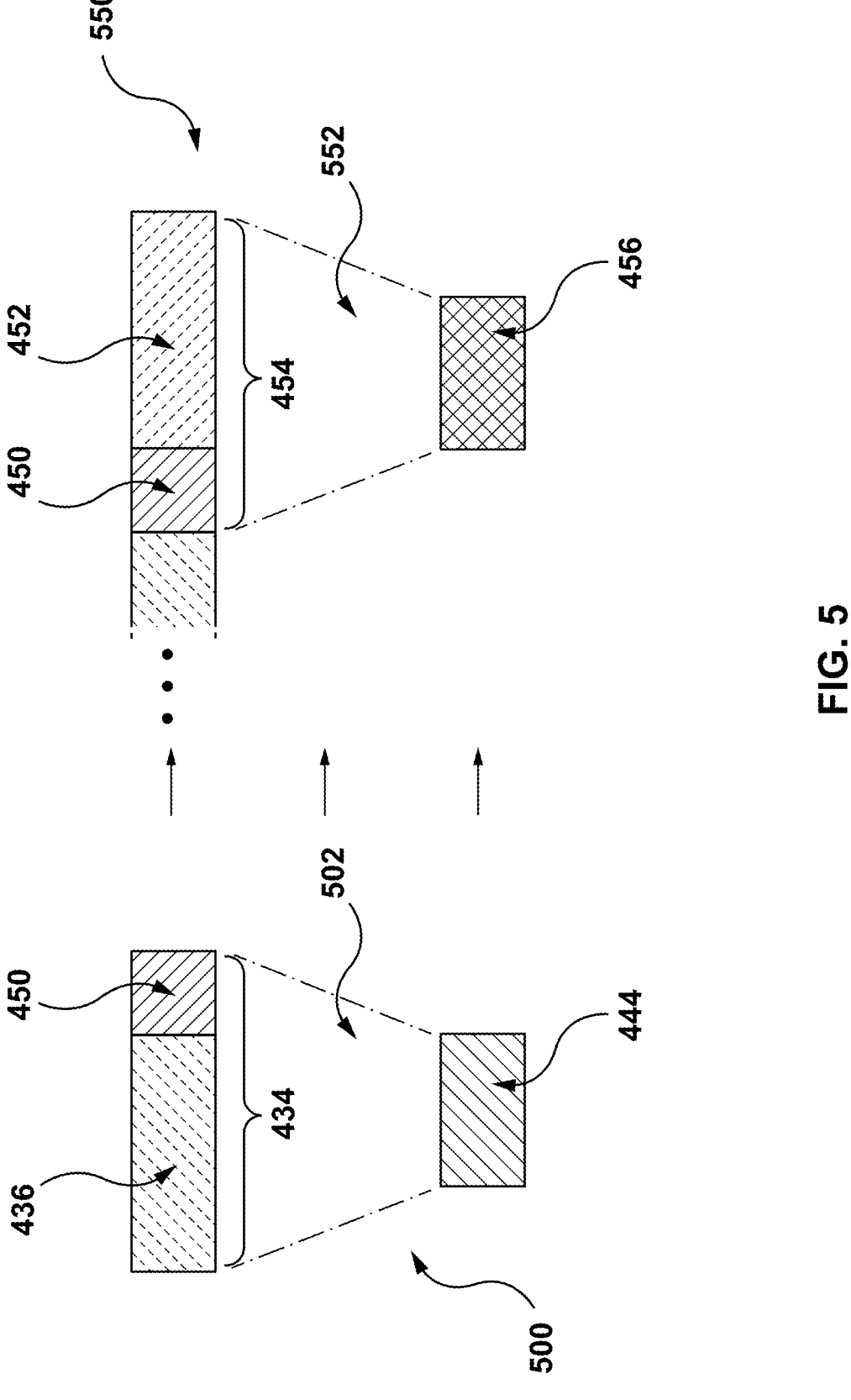
FIG. 5 depicts tensor data of a first hidden layer and of a second hidden layer of the CNN executed by the system of FIG. 1 generated during the first in-use iteration and during the subsequence in-use iteration of FIG. 4, in accordance with some non-limiting embodiments of the present technology.

To better illustrate this, reference will now be made to FIG. 5 depicting a representation 500 of how the second convolutional filter 442 is applied on tensor data of the first hidden layer 430 during the first in-use iteration 301, and a representation 550 of how the second convolutional filter 442 is applied on tensor data of the first hidden layer 430 during the second in-use iteration 302.

As explained above, during the first in-use iteration 301, the first hidden layer 430 generates and stores in the memory device 108 the first tensor data 434. This first tensor data 434 has the portion 436 and the tensor-chunk data 450 that are stored sequentially in the memory device 108. The server 106 applies the second convolutional filter 442 onto the first tensor data 434—that is, the server 106 executes a convolutional operation 502 during the first in-use iteration 301— and thereby generates the other tensor data 444. As mentioned above, in addition to the convolutional operation 502, the server 106 may further apply an activation function of the second hidden layer 440 for generating the other tensor data 444, but this will be omitted in the present example for sake of simplicity only.

During the second in-use iteration 302, the first hidden layer 430 generates the second tensor data 452 and stores the second tensor data 452 in the memory device 108 sequentially to the first tensor data 434. Recalling that the tensor-chunk data 450 is the latest portion (of a pre-determined size) of the first tensor data 434 stored in the memory for the first hidden layer 430, this means that when the second tensor data 452 is stored in the memory device 108, the second tensor data 452 is stored (written) sequentially to the tensor-chunk data 450. The server 106 applies the second convolutional filter 442 onto the augmented tensor data 454—that is, the server 106 executes a convolutional operation 552 during the second in-use iteration 302—and thereby generates the third tensor data 456. As mentioned above, in addition to the convolutional operation 552, the server 106 may further apply an activation function of the second hidden layer 440 for generating the third tensor data 456, but this will be omitted in the present example for sake of simplicity only.

As a result, as it can be seen on FIG. 5, the server 106 is configured to use a portion of tensor data computed by a given hidden layer during a given in-use iteration (i) for generating tensor data of a subsequent hidden layer during the given in-use iteration and (ii) for generating at least a portion of the tensor data of the subsequent hidden layer during a subsequent in-use iteration.

Furthermore, as previously alluded to, since the second tensor data 452 generated by the first hidden layer 430 excludes the redundant tensor-chunk data identical to the tensor-chunk data 450, less overall memory space may be required for storing tensor data generated by the first hidden layer 430.

In additional embodiments of the present technology, it is contemplated that, although not illustrated in FIGS. 4 and 5 for sake of simplicity, the second hidden layer 440 may be configured similarly to how the first hidden layer 430 is configured—that is, given tensor-chunk data from the other tensor data 444 generated during the first in-use iteration 301 may be used during the first in-use iteration 301 for generating the first waveform segment 310, and also re-used (instead of being re-calculated) during the second in-use iteration 302 for generating the second waveform segment 320.

In other embodiments of the present technology, it is also contemplated that the first hidden layer 430 may have more than one subsequent hidden layer. For example, some CNN architectures may be conceived where the output of the first hidden layer 430 is provided as input to more than one (sequential) second hidden layers. In these embodiments, more than one tensor-chunk data may be identified in the first tensor data 434 for corresponding second hidden layers similarly to what is described above (e.g., having respective pre-determined sizes that depend on the hyper-parameters of the respective convolutional filters of the corresponding more than one second hidden layers). As a result, the respective tensor-chunk data may be used during a given in-use iteration by corresponding ones of the more than one second hidden layers, and also re-used (as opposed to being re-calculated) during a subsequent in-use iteration by corresponding ones of the more than one second hidden layers.

How the server 106 may be configured to identify tensor-chunk data 450 in the memory device 108, how the server 106 may use tensor-chunk data 450 during the given in-use iteration for storing tensor data in the memory device 108, and how the server 106 may re-use tensor-chunk data 450 during a subsequent in-use iteration for storing tensor data in the memory 108 will now be described with reference to FIG. 6.

Figure 6:
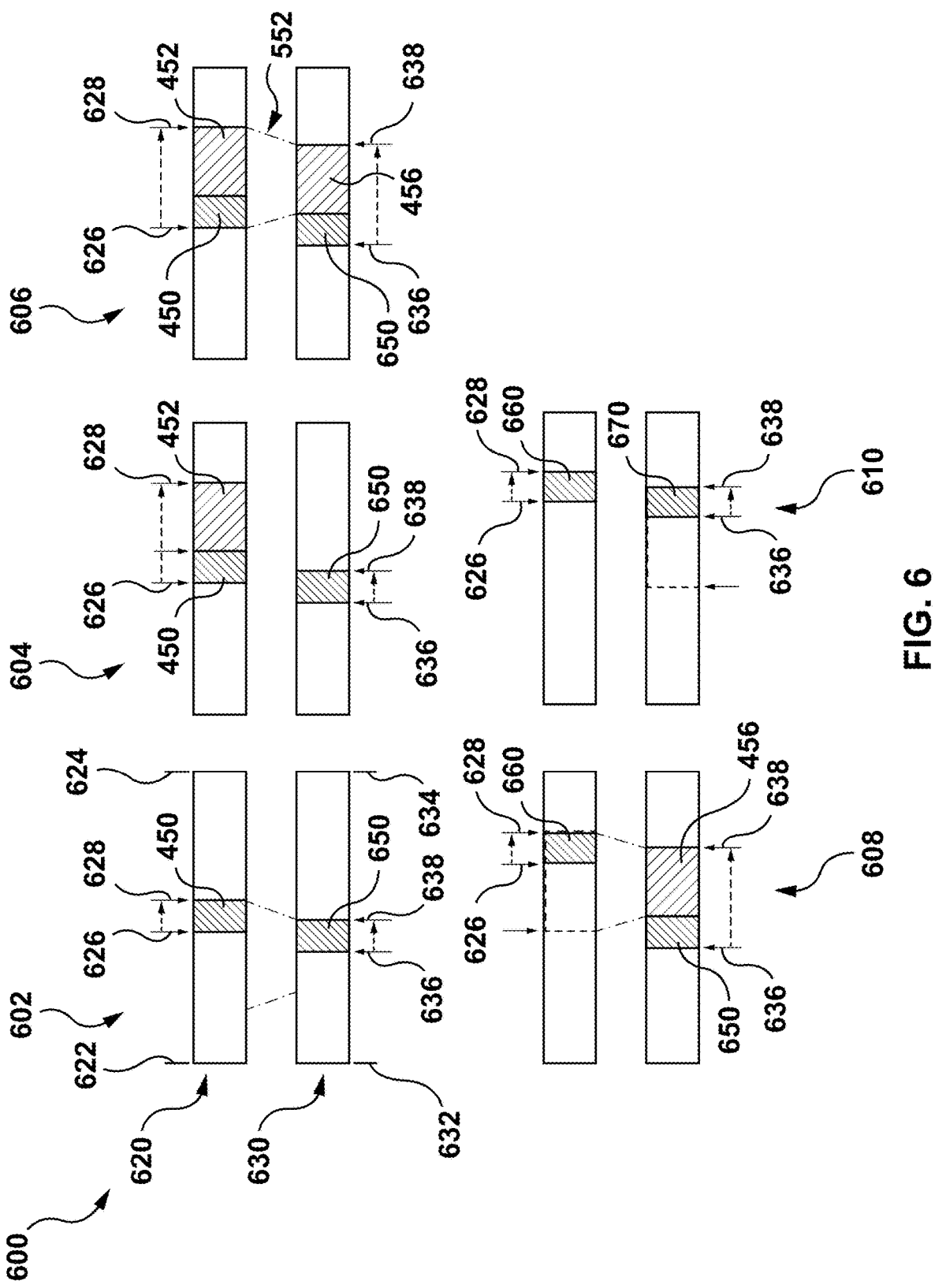
FIG. 6 depicts a representation of how tensor data for the first hidden layer and for the second hidden layer of the CNN executed by the system of FIG. 1 is stored in the memory device of FIG. 1, in accordance with some non-limiting embodiments of the present technology.

In FIG. 6, there is depicted a representation 600 of how the memory device 108 may be configured for storing tensor data for the first hidden layer 430 and for the second hidden layer 440 during the second in-use iteration 302. As seen, the method of storing the tensor data in the memory device 108 may have a plurality of steps, including steps 602, 604, 606, 608, and 610.

However, it should be noted that the illustrated non-limiting example in FIG. 5 has been simplified for sake of illustration, and that in some embodiments of the present technology, (i) a tensor-chunk data may be identified in tensor data of the first hidden layer 430 during each in-use iteration and (ii) (which is omitted from FIG. 5 for sake of simplicity) a tensor-chunk data may be identified in tensor data of the second hidden layer 440 during each in-use iteration. How tensor-chunk data is identified in tensor data of the first hidden layer 430 and of the second hidden layer 440, in at least some embodiments, during each in-use iteration will be described with reference to FIG. 6.

As previously mentioned, in some embodiments of the present technology, the memory device 108 may have layer-dedicated memory spaces for respective hidden layers of the CNN 180. In a non-limiting example depicted in FIG. 6, the first hidden layer 430 is associated with a first layer-dedicated memory space 620 in the memory device 108 and the second hidden layer 440 is associated with a second layer-dedicated memory space 630 in the memory device 108. It is contemplated that the first layer-dedicated memory space 620 may be defined by a pair of boundaries 622 and 624 in the memory device 108 and the second layer-dedicated memory space 630 may be defined by a pair of boundaries 632 and 634 in the memory device 108. It should be noted that the boundary 622 is indicative of a start-position of the first layer-dedicated memory space 620 and the boundary 624 is indicative of an end-position of the first layer-dedicated memory space 620. Similarly, the boundary 632 is indicative of a start-position of the second layer-dedicated memory space 630 and the boundary 634 is indicative of an end-position of the second layer-dedicated memory space 630.

It should be noted that the first layer-dedicated memory space 620, the second layer-dedicated memory space 630, the pair of boundaries 622 and 624, and the pair of boundaries 632 and 634 are identified as such only at the step 602 for sake of clarity.

It is contemplated that the memory device 108 may be configured such that a given layer-dedicated memory space for a respective hidden layer stores tensor data generated by the respective hidden layer during in-use iterations of the CNN 180.

In at least some non-limiting embodiments of the present technology, it is contemplated that the memory device 108 may be configured to execute one or more computer implemented procedures that allow employing a given layer-dedicated memory space as a cyclical (also known as circular) buffer for storing tensor data of a respective hidden layer. Broadly speaking, a cyclical buffer is a data structure that uses a fixed-size buffer as if it were connected end-to-end. For example, when the buffer is full or about to be full (when a layer-dedicated memory space is full or about to be full) a property of the cyclical buffer is that a subsequent write operation is performed over the oldest data in the buffer, and therefore it starts overwriting the oldest data in the buffer which is no longer needed.

Returning to the description of FIG. 6, it should be noted that flags 626 and 628 are used for writing tensor data of the first hidden layer 430 in the first layer-dedicated memory space 620. Similarly, flags 636 and 638 are used for writing tensor data of the second hidden layer 440 in the second layer-dedicated memory space 630.

Let it be assumed that the flags 626, 628, 636, and 638 as illustrated for the step 602 are positioned as if the first in-use iteration 301 has just ended. Therefore, at the step 602, the flags 626 and 628 identify the start-position and the end-position, respectively, of the tensor-chunk data 450 in the memory device 108. Also, at the step 602, the flags 636 and 638 identify the start-position and the end-position, respectively of a tensor-chunk data 650 of the other tensor data 444 of the second hidden layer 440 (assuming that the second hidden layer 440 is implemented similarly to the first hidden layer 430 and a subsequent hidden layer is configured to use the tensor-chunk data 650 for generating the first waveform segment 310 and will also re-use the tensor-chunk data 650 for generating the second waveform segment 320).

As mentioned above, the size of the tensor-chunk data 450 may depend on the hyper-parameters of the second convolutional filter 442. Similarly, the tensor-chunk data 650 may depend on hyper-parameters of a convolution filter of a hidden layer that is subsequent to the second hidden layer 440.

At the step 604, the flag (cursor) 628 is moved to a new position in the memory device 108, and a memory space between the positions of the flag 628 at the step 602 and at the step 604 is filled with the second tensor data 452 of the first hidden layer 430 computed during the second in-use iteration 302. For example, as previously alluded to a size of the second tensor data 452 (and therefore the amount by which the flag 628 is moved between at the step 604) in the memory device 108 depends on an amount of the additional input data available for the second in-use iteration (the amount of data in the second iteration-specific data 220).

At the step 606, the flag (cursor) 638 is moved to a new position in the memory device 108, and a memory space between the positions of the flag 638 at the step 602 and at the step 604 is filled with the third tensor data 456 of the second hidden layer 440 computed during the second in-use iteration 302. As seen, the server 106 may perform the convolutional operation 552 mentioned above onto the tensor-chunk data 450 and the second tensor data 452 for generating and storing the third tensor data 456.

At the step 608, the flag (cursor) 626 is moved to a new position in the memory device 108. As seen, at the step 608, the flags 626 and 628 identify a tensor-chunk data 660 from the second tensor data 452. It should be noted that the server 106 may employ the tensor-chunk data 660 during the second in-use iteration 302 and during the third in-use iteration 303 similarly to how the tensor-chunk data 450 is used during the first in-use iteration 301 and the second in-use iteration 302 (this has been omitted from the description of FIG. 5 for sake of simplicity).

It is contemplated that the size of the tensor-chunk data 660 may depend on the hyper-parameters of the second convolutional filter 442. Therefore, it is contemplated that the distance by which the flag 626 is moved at the step 608 may be determined at least partially based on the hyper-parameters of the second convolutional filter 442. For example, once the size of the tensor-chunk data 660 is determined based on the hyper-parameters of the second convolutional filter 442, the flag 626 can be moved from its position at the step 606 to its position at the step 608, such that the distance between the flags 626 and 628 now identifies a latest memory space of a size equal to the so-determined size of the tensor-chunk data 660.

Furthermore, although not illustrated, a convolution filter of a subsequent hidden layer of the second hidden layer may be used to apply a convolutional operation on the tensor-chunk data 650 and the third tensor data 456 similarly to how the second convolutional filter 442 of the second hidden layer 440 may be used to apply the convolutional operation 552 on the tensor-chunk data 450 and the second tensor data 452.

Then, at the step 610, the flag (cursor) 636 is moved to a new position in the memory device 108. As seen, at the step 610, the flags 636 and 638 identify a tensor-chunk data 670 from the third tensor data 456. It should be noted that the server 106 may employ the tensor-chunk data 670 during the second in-use iteration 302 and during the third in-use iteration 303 similarly to how the tensor-chunk data 650 is used during the first in-use iteration 301 and the second in-use iteration 302.

It is contemplated that the size of the tensor-chunk data 670 may depend on the hyper-parameters of the convolution filter of a subsequent hidden layer to the second hidden layer 440. Therefore, it is contemplated that the distance by which the flag 636 is moved at the step 610 may be determined (or pre-determined) at least partially based on the hyper-parameters of the convolution filter of a subsequent hidden layer to the second hidden layer 440. For example, once the size of the tensor-chunk data 660 is determined based on the hyper-parameters of the convolution filter of a subsequent hidden layer to the second hidden layer 440, the flag 636 is moved from its position at the step 608 to its position at the step 610, such that the distance between the flags 636 and 638 now identifies a latest memory space of a size equal to the so-determined size of the tensor-chunk data 670.

In at least some embodiments of the present technology, it is contemplated that the server 106 may be configured to operate the memory device 108 during each respective in-use iteration similarly to how the server 106 is configured to operate the memory device 108 in the illustrated non-limiting example of FIG. 6.

It should also be noted that in some embodiments where the first hidden layer 430 has more then one second hidden layers, the memory device 108 may employ more than one respective pairs of flags in the first layer-dedicated memory space 620 for more than one corresponding second hidden layers, similarly to how the pair of flags 626 and 628 are implemented in connection to the second hidden layer 440.

Figure 7:
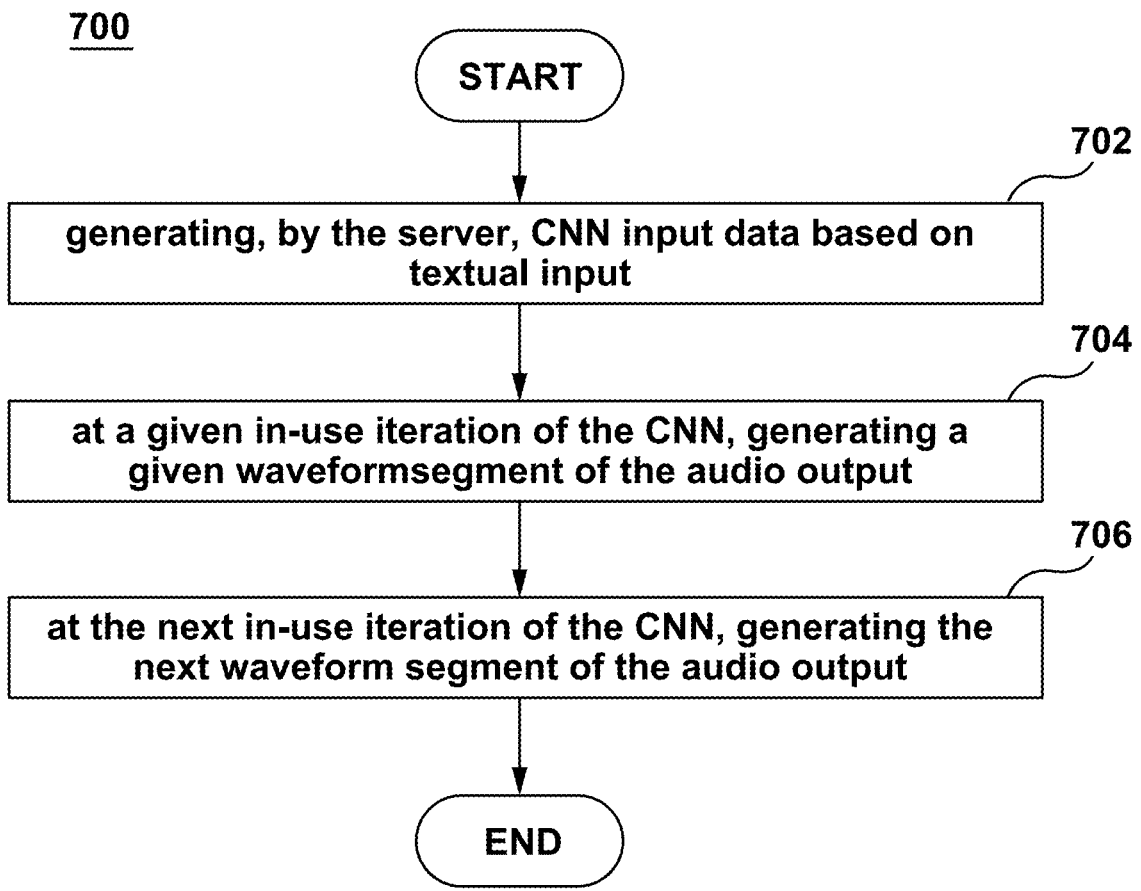
FIG. 7 is a schematic block diagram of a method of performing text-to-speech (TTS) processing of a textual input for generating an audio output, in accordance with some non-limiting embodiments of the present technology.
Figure 8:
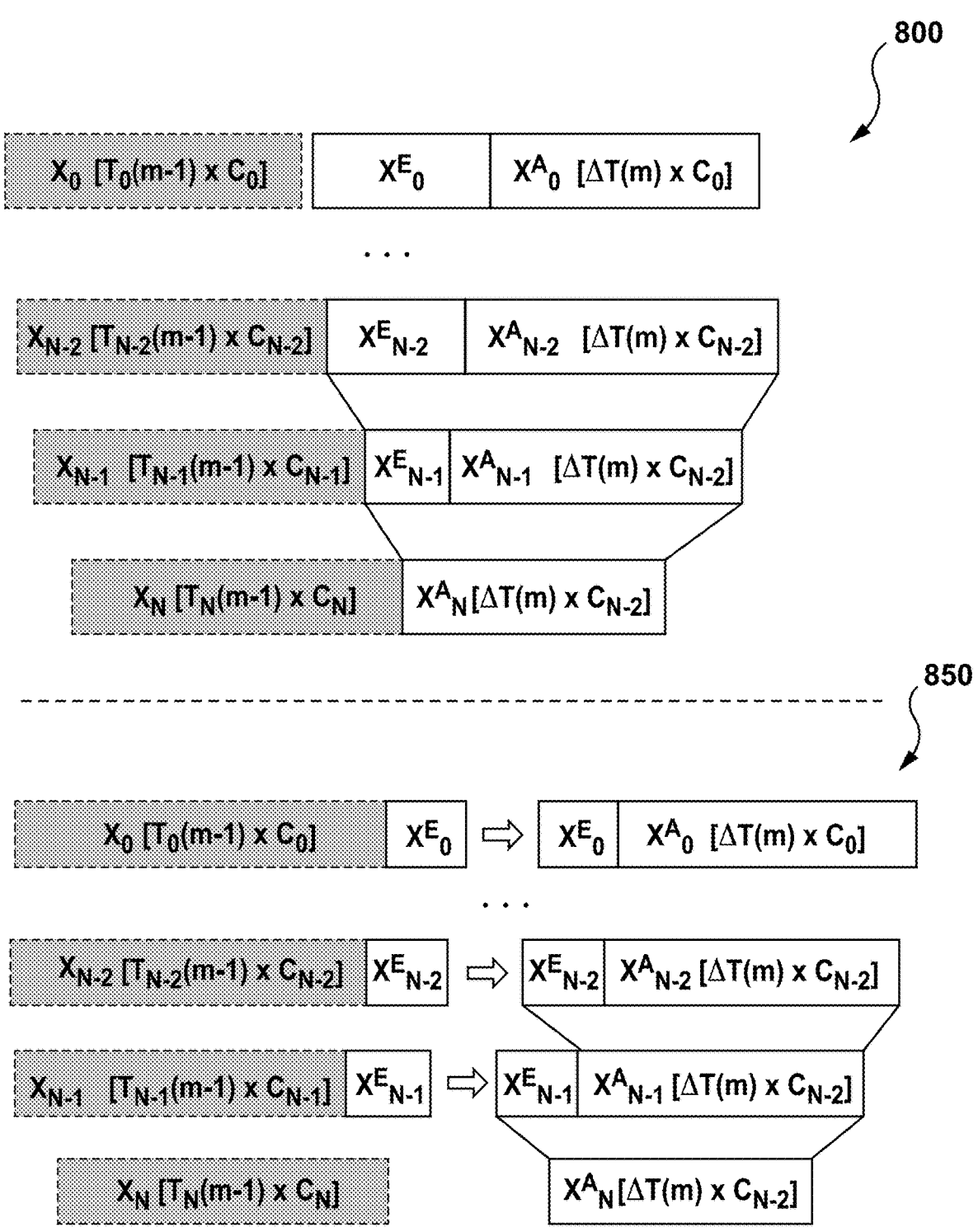
FIG. 8 depicts a representation of calculation scheme of a streaming CNN without storing intermediate data from previous iterations, and a representation of a modified calculation scheme with storage of intermediate data from precious iteration, in in accordance with some non-limiting embodiments of the present technology.

In some embodiments of the present technology, the server 106 may be configured to execute a method 700 depicted on FIG. 7 of performing text-to-speech processing of a given textual input for generating a given audio output. Various steps of the method 700 will now be described in greater details.

Step 702: Generating CNN Input Data Based on the Textual Input

The method 700 begins at step 702 with the server 106 configured to generate the CNN input data 208 (see FIG. 2) based on the textual input 200. It should be noted that the CNN input data 208 is associated with respective timestamps. These timestamps can be used for determining iteration-specific input data for a respective in-use iteration of the CNN 180.

For example, the CNN input data 208 may be in a form of the spectrogram 204. It is contemplated that the CNN input data 208 may be generated based on the spectrogram 204. In at least one embodiment of the present technology, the server 106 may be configured to employ the text-to-spectrogram procedure 202 for generating the spectrogram 204 based on the textual input 200.

Step 704: At a Given In-Use Iteration of the CNN, Generating a Given Waveform Segment of the Audio Output The method 700 continues to step 704 with the server 106 being configured to, during a given in-use iteration of the CNN 180 generate a given waveform segment of the audio output 350. For example, the server 106 may be configured to generate during the first in-use iteration 301 the first waveform segment 310 based on the first iteration-specific data 210 available for the first in-use iteration 301.

It should be noted that, as part of the step 704, the server 106 may be configured to store, in the memory device 108 the first tensor data 434 computed by the first hidden layer 430 during the first in-use iteration 301. Also, it should be noted that the first tensor data 434 has the tensor-chunk data 450. As explained above, the tensor-chunk data 450 is (i) used during the first in-use iteration 301 for generating the first waveform segment 310 of the audio output 350 and (ii) also to be used during the second in-use iteration 302 (the sequentially next in-use iteration) of the CNN 180 for generating the second waveform segment 320 of the audio output 350.

Furthermore, it should be noted that the tensor-chunk data 450 is identifiable by a start-position thereof and an end-position thereof in the memory device 108. For example, at the end of the first in-use iteration 301, the tensor-chunk data 450 may be identifiable via a current position (at the end of the first in-use iteration 301) of the flag 626 in the memory device 108 and a current position of the flag 628 in the memory device 108.

In some embodiments of the present technology, the first hidden layer 430 may have a given activation function, and the tensor-chunk data 450 from the first tensor data 434 generated during the first in-use iteration 301 is an output of that activation function. It is contemplated that the output of the first convolutional filter 432 may be provided to the given activation function that is configured to output at least a portion of the first tensor data 434.

It is also contemplated that the size of the first tensor data 434 that is generated and stored in the memory device 108 may depend on an amount of iteration-specific data available for the first in-use iteration 301. For example, the larger the amount of iteration-specific data in the first iteration-specific data 210 the larger the size of the first tensor data 434 to be stored in the memory device 108 (e.g., the larger the distance by which the flag 628 is to be moved between the step 602 and 604).

In at least some embodiments of the present technology, the size of the tensor-chunk data 450 stored in the memory device 108 may have been determined based on hyper parameters of the second convolutional filter 442 of the second hidden layer 440. This means that the amount of tensor data from the first tensor data 434 to be re-used during a subsequent in-use iteration, as explained above, may be pre-determined based on the hyper parameters of the second convolutional filter 442 of the second hidden layer 440. For example, the hyper parameters of the second convolutional filter 442 may include at least one of: a kernel size parameter, a stride parameter, and a dilation parameter.

As mentioned above the memory device 108 may comprise the first layer-dedicated memory space 620 for the first hidden layer 430 and the second layer-dedicated memory space 630 for the second hidden layer 440. The first layer-dedicated memory space 620 can be defined by the boundaries 622 and 624. The second layer-dedicated memory space 630 can be defined by the boundaries 632 and 634. In some embodiments, the server 106 may be configured to use information indicative of a pair of flags (cursors), including the flags 626 and 628, within the boundaries 622 and 624 of the first layer-dedicated memory space 620. For example, as seen at the step 602 illustrated on FIG. 6, which shows a representation of the first layer-dedicated memory space 620 after the first in-use iteration 301, the flag 626 may be located a first position corresponding to the start-position of the tensor-chunk data 450 in the memory device 108 and the flag 628 may be located at a second position corresponding to the end-position of the tensor-chunk data 450 in the memory device 108.

Step 706: At the Next In-Use Iteration of the CNN, Generating the Next Waveform Segment of the Audio Output The method 700 continues to step 706 with the server 106 configured to, during the next in-use iteration of the CNN 180, generate the next waveform segment of the audio output 350. For example, the server 106 may be configured to generate the second waveform segment 320 based on the second iteration-specific data 220 and the portion 215 of the first iteration-specific data 210 (internally available). In some embodiments, the size of the second tensor data 452 in the memory depends on an amount of the second iteration-specific data 220 available for the second in-use iteration 302.

It should be noted that as part of the step 706, the server 106 is configured to store the second tensor data 452 computed by the first hidden layer 430 during the second in-use iteration 302. As seen on FIG. 5, the second tensor data 452 is stored in the memory device 108 sequentially to the first tensor data 434 of the first hidden layer 430 from the first in-use iteration 301.

It should be noted that the second tensor data 452 excludes a redundant tensor-chunk data that is identical to the tensor-chunk data 450 from the first tensor data 434. It is contemplated that the CNN 180 may be configured not to calculate the redundant tensor-chunk data (or re-calculate the tensor-chunk data 450) during the second in-use iteration 302.

It should also be noted that the second tensor data 452 is identifiable by a start-position of the second tensor data 452 in the memory device and an end-position of the second tensor data 452 in the memory device 108 and where the start-position of the second tensor data 452 corresponds to the end-position of the tensor-chunk data 450 in the memory device 108 as seen on FIG. 5.

In at least some embodiments, it is contemplated that during the storing of the second tensor data 452, the flag 628 may be moved from its position as illustrated at the step 602 to a new position in the memory device 108 as illustrated at the step 604 (see FIG. 6). In this case, the second tensor data 452 may be stored in the memory device 108 between the position of the flag 628 at the step 602 and the new position of the flag 628 at the step 604. Also, as it can be seen on FIG. 6, the tensor-chunk data 450 and the second tensor data 452 are stored sequentially in the memory device 108 between the position of the first flag 626 at the step 602 (and 604) corresponding to the start-position of the tensor-chunk data 450 and the new position of the flag 628 at the step 604.

It should also be noted that as part of the step 706, the server 106 is configured to apply the second convolutional filter 442 of the second hidden layer 440 on (i) the tensor-chunk data 450 from the first tensor data 434 and (ii) the second tensor data 452 stored in the memory device 108. The server 106 is thereby configured to generate the third tensor data 456 by the second hidden layer 440 to be stored in the memory device 108. As explained above, the third tensor data 456 is used for generating the second waveform segment 320 of the audio output 350.

It is contemplated that the server 106 may also be configured to store the third tensor data 456 in the memory device 108.

It is contemplated that after the first in-use iteration, the flag 636 may be located at a given position in the second layer-dedicated memory space 630 as illustrated in FIG. 6. Also, the flag 638 may be located at a given position in the second layer-dedicated memory space 630 as illustrated in FIG. 6. In at least some embodiments of the present technology, the server 106 configured to apply the second convolutional filter 442 on (i) the tensor-chunk data 450 from the first tensor data 434 and (ii) the second tensor data 452 (e.g., performing the convolutional operation 552) may comprise the server 106 configured to employ the flags 626 and 628 for determining which data stored in the first layer-dedicated memory space 620 is to be convoluted by the second convolutional filter 442. For example, the server 106 may be configured to apply the convolutional filter 442 on data stored between the position of the flag 626 at the step 602 (and the step 604) and the new position of the flag 636 at the step 604. For example, the server 106 may be configured to perform the convolutional operation 552 onto data between the positions of the flags 626 and 628 as seen at the step 606.

In some embodiments, the server 106 configured to store the third tensor data 456 may comprise moving the flag 638 to a new position in the memory device 108, such that the third tensor data 456 is stored in the memory device 108 between the position of the flag 638 at the step 604 and the new position of the flag 638 at the step 606.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of performing text-to-speech (TTS) processing of a textual input for generating an audio output, the audio output to be provided to a user of an electronic device and comprising a plurality of sequential waveform segments, the electronic device being communicatively coupled to a server, a given one of the plurality of sequential waveform segments to be generated in real-time during a respective in-use iteration of a trained Convolutional Neural Network (CNN), the CNN comprising at least a first hidden layer and a second hidden layer, the second hidden layer being sequential to the first hidden layer, the second hidden layer being configured to generate tensor data based on tensor data generated by the first hidden layer during a respective in-use iteration of the CNN, the method executable by the server, the method comprising:

generating, by the server, CNN input data based on the textual input, the CNN input data being associated with respective timestamps, the timestamps to be used for determining iteration-specific input data for a respective in-use iteration of the CNN;

at a given in-use iteration of the CNN:

generating, by the server employing the CNN, a given waveform segment of the audio output based on first iteration-specific data available for the given in-use iteration, the generating comprising:

storing, in a memory, first tensor data computed by the first hidden layer during the given in-use iteration, the first tensor data having tensor-chunk data, the tensor-chunk data (i) being used during the given in-use iteration for generating the given waveform segment of the audio output and (ii) to be used during a next in-use iteration of the CNN for generating a next waveform segment of the audio output, the tensor-chunk data being identifiable by a start-position of the tensor-chunk data in the memory and an end-position of the tensor-chunk data in the memory;

at the next in-use iteration of the CNN:

generating, by the server employing the CNN, the next waveform segment of the audio output based on second iteration-specific data available for the next in-use iteration and a portion of the first iteration-specific data, the generating comprising:

storing, in the memory, second tensor data computed by the first hidden layer during the next in-use iteration, the second tensor data being stored in the memory sequentially to the first tensor data of the first hidden layer from the given in-use iteration, the second tensor data excluding a redundant tensor-chunk data, the redundant tensor-chunk data being identical to the tensor-chunk data from the first tensor data, the second tensor data being identifiable by a start-position of the second tensor data in the memory and an end-position of the second tensor data in the memory, the start-position of the second tensor data corresponding to the end-position of the tensor-chunk data in the memory;

applying, by the server, a convolution filter of the second hidden layer on (i) the tensor-chunk data from the first tensor data and (ii) the second tensor data stored in the memory, thereby generating third tensor data by the second hidden layer to be stored in the memory, the third tensor data being used for generating the next waveform segment of the audio output; and storing, by the server, the third tensor data in the memory, wherein the memory comprises a layer-dedicated memory space for a respective hidden layer of the CNN, the layer-dedicated memory space being defined by boundaries in the memory, a first boundary being indicative of a start-position of the respective layer-dedicated memory space in the memory and a second boundary being indicative of an end-position of the respective layer-dedicated memory space in the memory, the layer-dedicated memory space for a respective hidden layer being configured to store tensor data generated by the respective hidden layer during in-use iterations of the CNN, wherein:

a pair of flags associated with a first layer-dedicated memory space for the first hidden layer are used when storing data generated by the first hidden layer, the pair of flags being within the boundaries of the first layer-dedicated memory space, a pair of other flags associated with a second layer-dedicated memory space for the second hidden layer are used for storing data generated by the second hidden layer, the pair of other flags being within the boundaries of the second layer-dedicated memory space, and wherein the pair of flags comprises a first flag and a second flag and the pair of other flags comprise a third flag and a fourth flag, after the given in-use iteration:

the first flag being located a first position corresponding to the start-position of the tensor- chunk data in the memory and the second flag being located at a second position corresponding to the end-position of the tensor-chunk data in the memory, the third flag being located at a third position in the second layer-dedicated memory space and the fourth flag being located at a fourth position in the second layer-dedicated memory space, during the next in-use iteration:

the storing the second tensor data computed by the first hidden layer comprises:

moving the second flag to a new second position in the memory, the second tensor data being stored in the memory between the second position and the new second position, the tensor-chunk data and the second tensor data being stored sequentially in the memory between the first position of the first flag corresponding to the start-position of the tensor-chunk data and the new second position of the second flag, the applying the convolutional filter on (i) the tensor-chunk data from the first tensor data and (ii) the second tensor data comprises:

applying the convolutional filter on data stored in the memory between the first position of the first flag and the new second position of the second flag, the storing the third tensor data in the memory comprises:

moving the fourth flag to a new fourth position in the memory, the third tensor data being stored in the memory between the fourth position and the new fourth position.

2. The method of claim 1, wherein the CNN input data is in a form of a spectrogram.

3. The method of claim 2, wherein the CNN input data is generated by an other trained model, the other trained model configured to transform textual input into a spectrogram output.

4. The method of claim 1, wherein the memory is from a GPU-type memory device.

5. The method of claim 1, wherein the first hidden layer has an activation function, the tensor-chunk data from the first tensor data generated during the given in-use iteration being an output of the activation function.

6. The method of claim 1, wherein a size of the first tensor data in the memory depends on an amount of iteration-specific data available for the given in-use iteration.

7. The method of claim 1, wherein a size of the second tensor data in the memory depends on an amount of the second iteration-specific data available for the next in-use iteration.

8. The method of claim 1, wherein a size of the tensor-chunk data in the memory has been determined based on hyper parameters of the convolutional filter of the second hidden layer.

9. The method of claim 8, wherein the hyper parameters include at least some of: a kernel size parameter, a stride parameter, and a dilation parameter.

* * * * *